(12) United States Patent
Reddy Yaddala

(10) Patent No.: US 12,481,954 B2
(45) Date of Patent: Nov. 25, 2025

(54) SYSTEMS AND METHODS FOR PREDICTING DEFECTIVE BINS IN AN INVENTORY SYSTEM

(71) Applicant: Target Brands, Inc., Minneapolis, MN (US)

(72) Inventor: Pratheep Kumar Reddy Yaddala, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 291 days.

(21) Appl. No.: 18/131,914

(22) Filed: Apr. 7, 2023

(65) Prior Publication Data

US 2023/0351324 A1    Nov. 2, 2023

Related U.S. Application Data

(60) Provisional application No. 63/335,463, filed on Apr. 27, 2022.

(51) Int. Cl.
  *G06Q 10/087*    (2023.01)
  *G06N 20/20*    (2019.01)
(52) U.S. Cl.
  CPC ........... *G06Q 10/087* (2013.01); *G06N 20/20* (2019.01)
(58) Field of Classification Search
  CPC .............................. G06Q 10/087; G06N 20/20
  See application file for complete search history.

(56) References Cited

U.S. PATENT DOCUMENTS

| | | | |
|---|---|---|---|
| 7,644,863 B2* | 1/2010 | Chen | G06Q 10/06 705/28 |
| 8,650,079 B2* | 2/2014 | Fano | G06Q 30/0255 705/14.43 |
| 10,621,545 B2* | 4/2020 | Takigawa | G06N 20/00 |
| 11,010,903 B1* | 5/2021 | Gallaudet | G06V 20/46 |
| 11,120,361 B1* | 9/2021 | Januschowski | G06N 20/00 |
| 11,170,391 B2* | 11/2021 | Morgan | G06Q 10/06315 |
| 11,556,879 B1* | 1/2023 | Timmons | G06Q 10/06398 |
| 11,715,052 B2* | 8/2023 | Yesudas | G06N 5/04 705/7.25 |
| 2018/0285902 A1* | 10/2018 | Nazarian | G06Q 30/0202 |

(Continued)

FOREIGN PATENT DOCUMENTS

| | | |
|---|---|---|
| CN | 110705683 A | 1/2020 |
| CN | 111093123 A | 5/2020 |
| JP | 2021101338 A | 7/2021 |

*Primary Examiner* — Michael Jared Walker
(74) *Attorney, Agent, or Firm* — Barnes & Thornburg LLP

(57) ABSTRACT

The disclosed technology provides for training a model to predict defective bins in a distribution center. A method includes retrieving bin data for a distribution center, partitioning the bin data into testing data and training data, designating a portion of the training data as defective bin data, designating a remaining portion of the training data as non-defective bin data, iteratively generating and testing models until a test model satisfies performance testing criteria, designating a portion of the bin data as complete defective bin data and a remaining portion as non-defective bin data, generating a complete model training data set combining the complete defective bin data and a portion of the non-defective bin data, and training a runtime model using the complete model training data set and training parameters determined in the iterative generating and testing steps.

20 Claims, 15 Drawing Sheets

(56) References Cited

U.S. PATENT DOCUMENTS

| | | | |
|---|---|---|---|
| 2019/0034834 A1* | 1/2019 | Jiang | G06N 20/00 |
| 2019/0347607 A1* | 11/2019 | Shi | G06N 7/01 |
| 2021/0398046 A1* | 12/2021 | Custer | G06Q 10/06375 |
| 2023/0094759 A1* | 3/2023 | Wick | G06N 20/00 |
| | | | 705/7.31 |
| 2023/0122754 A1* | 4/2023 | Cornejo Barriere | G06N 20/20 |
| | | | 705/28 |
| 2023/0214765 A1* | 7/2023 | Blake | G06Q 10/08 |
| | | | 705/28 |
| 2023/0297948 A1* | 9/2023 | Borjian | G06Q 10/087 |
| | | | 705/28 |

* cited by examiner

Defective Bin Predictions Output 500

★ ICQA IDBA RDC Predicted Bins Daily    📅 Last Segment 2021-10-03 TO 2021-10-04    [≡ Filter By ①]

⊘ bin_rank_bucket in RANK: 001-025,... ⊗

| dc_i | Last Update Dt. | Last Update Hr. | bin_loc_l_mod | bin_area_c | aisle | bin | lvl | bin_rank_bucket | bin_rank_new | bin_pred_prob |
|---|---|---|---|---|---|---|---|---|---|---|
| 3801 | 2021-10-04 | 15 | 109-008-07 | TI | 109 | 008 | 07 | RANK: 026-050 | 37 | 0.76 |
| 3801 | 2021-10-04 | 15 | 132-051-10 | HD | 132 | 051 | 10 | RANK: 026-050 | 27 | 0.78 |
| 3801 | 2021-10-04 | 15 | 139-020-12 | SF | 139 | 020 | 12 | RANK: 026-050 | 39 | 0.76 |
| 3801 | 2021-10-04 | 15 | 238-011-02 | TI | 238 | 011 | 02 | RANK: 026-050 | 31 | 0.76 |
| 3801 | 2021-10-04 | 15 | 238-011-03 | TI | 238 | 011 | 03 | RANK: 001-025 | 9 | 0.82 |
| 3801 | 2021-10-04 | 15 | 238-041-08 | NR | 238 | 041 | 08 | RANK: 026-050 | 35 | 0.76 |
| 3801 | 2021-10-04 | 15 | 248-009-01 | TU | 248 | 009 | 01 | RANK: 001-025 | 7 | 0.82 |
| 3801 | 2021-10-04 | 15 | 248-038-01 | TU | 248 | 038 | 01 | RANK: 001-025 | 21 | 0.78 |
| 3801 | 2021-10-04 | 15 | 248-070-01 | TU | 248 | 070 | 01 | RANK: 026-050 | 46 | 0.74 |
| 3801 | 2021-10-04 | 15 | 255-037-01 | CB | 255 | 037 | 01 | RANK: 001-025 | 19 | 0.80 |
| 3801 | 2021-10-04 | 15 | 255-130-01 | CB | 255 | 130 | 01 | RANK: 026-050 | 26 | 0.78 |
| 3801 | 2021-10-04 | 15 | 303-120-03 | HD | 303 | 120 | 03 | RANK: 001-025 | 25 | 0.78 |
| 3801 | 2021-10-04 | 15 | 315-020-10 | FD | 315 | 020 | 10 | RANK: 026-050 | 42 | 0.76 |
| 3801 | 2021-10-04 | 15 | 316-156-04 | CR | 316 | 156 | 04 | RANK: 026-050 | 28 | 0.78 |
| 3801 | 2021-10-04 | 15 | 329-004-02 | FD | 329 | 004 | 02 | RANK: 001-025 | 20 | 0.80 |

FIG. 5

Output 602

☆ Bin Cleansing - Bin Level Defect % - Previous 8 Weeks ⊙ Last 8 Weeks | ☰ Filter By | ⓘ

ⓧ aud_type in IDBA Generated Audit...

| DC Location | 2022 - WK02 | 2022 - WK03 | 2022 - WK04 | 2022 - WK05 | 2022 - WK06 | 2022 - WK07 | 2022 - WK08 | 2022 - WK09 |
|---|---|---|---|---|---|---|---|---|
| T-3801 Midlothian RDC | 24.00% | 16.67% | 19.57% | 16.84% | 13.85% | 18.39% | 23.33% | 16.96% |
| T-3803 Topeka RDC | 25.47% | 25.93% | 23.78% | 23.85% | 22.60% | 19.61% | 16.77% | 20.25% |
|  | 15.22% | 12.84% | 10.47% | 10.65% | 12.96% | 3.51% | 9.38% | 21.95% |
| T-3806 Rialto RDC | 19.31% | 18.65% | 16.16% | 14.94% | 27.24% | 14.18% | 14.14% | 17.79% |
|  | 14.72% | 12.76% | 20.66% | 18.42% | 19.43% | 11.72% | 21.64% | 29.41% |
|  | 23.98% | 23.86% | 18.18% | 23.51% | 15.00% | 24.82% | 15.03% | 15.00% |
| T-3810 Savannah IW | 3.59% | 7.56% | 2.67% | 3.13% | 4.46% | 3.08% | 7.04% | 1.65% |
|  | 21.05% | 11.49% | 14.78% | 0.00% |  | 9.68% |  |  |
| T-3840 Rialto UDC | 18.62% | 10.00% | 18.71% | 18.60% | 14.98% | 12.55% | 20.25% | 28.57% |
|  | 31.89% | 33.44% | 26.79% | 37.14% | 59.21% | 35.48% | 33.52% | 18.97% |
| T-3842 Dekalb UDC | 12.99% | 16.51% | 16.00% | 19.86% | 33.33% | 0.00% |  | 9.09% |
|  | 13.83% | 13.36% | 12.40% | 11.37% | 10.03% | 11.20% | 13.73% | 10.76% |
| T-554 Pueblo RDC | 19.81% | 26.34% | 15.96% | 29.23% | 17.70% | 25.47% | 25.35% | 24.08% |
|  | 16.91% | 14.19% | 18.09% | 21.74% | 20.21% | 18.68% | 16.08% | 19.20% |
| T-557 Oconomowoc RDC | 30.49% | 16.60% | 18.46% | 11.64% | 15.72% | 15.09% | 13.50% | 11.81% |
|  | 9.03% | 11.95% | 0.00% | 0.00% | 10.00% | 10.47% | 8.54% | 17.88% |
|  | 14.29% | 24.52% | 22.71% | 25.60% | 32.28% | 23.14% | 18.15% | 23.92% |
| T-594 Lugoff RDC | 25.61% | 18.80% | 11.51% | 13.60% | 11.58% | 21.37% | 20.00% | 19.31% |
|  | 2.44% | 0.00% | 0.00% | 0.00% | 0.96% | 0.00% | 0.00% | 3.88% |
| T-551 Fridley RDC |  | 14.29% | 11.59% | 27.66% | 13.49% | 11.07% | 11.48% | 14.58% |
|  |  | 0.00% | 33.33% | 16.42% | 17.09% | 23.42% | 25.00% | 32.42% |
| T-590 Cedar Falls RDC |  | 5.00% | 21.67% | 19.69% | 15.15% | 4.23% | 16.95% | 22.22% |
|  |  |  | 35.58% |  | 26.09% | 27.02% | 21.96% | 31.60% |

Accounting Week

FIG. 6B

Legend: 55% / 50% / 45% / 40% / 35% / 30% / 25% / 20% / 15% / 10% / 5% / 0.00%

Output 604

☆ Bin Cleansing - Unit DPMO - Previous 8 Weeks ⊗

🖉 aud_type in IDBA Generated Audit.... ⊗                    🗓 Last 8 Weeks    ≡ Filter By  ①

| DC Location | 2022-WK02 | 2022-WK03 | 2022-WK04 | 2022-WK05 | 2022-WK06 | 2022-WK07 | 2022-WK08 | 2022-WK09 | |
|---|---|---|---|---|---|---|---|---|---|
| T-3801 Midlothian RDC | 189,475.30 | 150,268.34 | 63,047.76 | 18,071.54 | 72,182.05 | 156,403.98 | 42,605.78 | 1,073,095.98 | 2,100,0 |
|  | 112,475.89 | 585,856.03 | 403,959.47 | 61,304.83 | 104,408.25 | 29,737.08 | 355,029.99 | 54,589.14 | 2,000,0 |
| T-3803 Topeka RDC | 30,018.17 | 2,201.91 | 22,085.91 | 17,705.71 | 12,800.59 | 370.20 | 65,102.89 | 129,268.09 | 1,900,0 |
|  | 33,218.08 | 139,100.78 | 71,585.57 | 69,052.56 | 184,691.08 | 31,144.33 | 54,305.90 | 414,854.92 | 1,800,0 |
| T-3806 Rialto RDC | 63,209.22 | 64,374.81 | 52,544.51 | 114,833.52 | 42,456.26 | 13,804.71 | 9,344.97 | 89,529.12 | 1,700,0 |
|  | 105,359.03 | 34,621.64 | 44,976.92 | 225,611.31 | 66,667.72 | 19,206.29 | 3,682.16 | 3,501.12 | 1,600,0 |
| T-3810 Savannah IW | 15,476.47 | 93,815.78 | 30,392.65 | 50,975.29 | 45,477.08 | 33,732.30 | 48,365.40 | 52,420.98 | 1,500,0 |
|  | 22,868.72 | 10,035.36 | 8,313.23 | 0.00 |  | 2,910.56 |  |  | 1,400,0 |
| T-3840 Rialto UDC | 20,382.59 | 31,829.03 | 20,929.79 | 110,889.36 | 24,211.48 | 12,560.04 | 43,354.41 | 175,966.63 | 1,300,0 |
|  | 204,455.17 | 199,747.21 | 220,163.07 | 314,891.96 | 388,608.51 | 105,591.30 | 424,219.51 | 413,464.09 | 1,200,0 |
| T-3842 Dekalb UDC | 51,587.74 | 40,058.13 | 27,033.84 | 50,473.41 | 154,777.93 | 0.00 |  | 3,850.47 | 1,100,0 |
|  | 25,105.15 | 23,116.87 | 3,819.40 | 47,071.47 | 85,690.45 | 29,383.54 | 14,668.22 | 9,549.73 | 1,000,0 |
| T-554 Pueblo RDC | 49,048.45 | 70,504.17 | 43,118.93 | 442,890.12 | 158,071.82 | 92,366.19 | 112,198.22 | 127,310.38 | 900,00 |
|  | 149,998.17 | 49,479.17 | 268,630.93 | 140,950.16 | 753,828.92 | 75,299.26 | 264,606.55 | 78,046.09 | 800,00 |
| T-557 Oconomowoc RDC | 35,022.53 | 93,048.70 | 101,838.21 | 97,121.90 | 13,041.46 | 67,226.89 | 63,009.43 | 13,425.17 | 700,00 |
|  | 368,772.15 | 40,584.88 | 0.00 | 0.00 | 17,760.24 | 10,037.94 | 79,879.37 | 17,378.74 | 600,00 |
| T-594 Lugoff RDC | 61,820.17 | 55,253.15 | 25,662.73 | 41,815.93 | 22,522.15 | 40,489.58 | 59,088.78 | 14,816.75 | 500,00 |
|  | 1,235.25 | 0.00 | 556,993.78 | 88,520.43 | 33,502.83 | 70,017.09 | 54,724.10 | 74,373.56 | 400,00 |
| T-551 Fridley RDC |  | 2,622.79 | 4,816.85 | 49,553.74 | 40,879.74 | 0.00 | 0.00 | 5,156.92 | 300,00 |
|  |  | 0.00 | 28,846.15 | 2,141,940.71 | 57,054.86 | 5,421.83 | 23,117.93 | 5,595.42 | 200,00 |
| T-590 Cedar Falls RDC | 10,899.59 | 39,221.74 | 92,270.66 | 15,952.35 | 13,186.43 | 516.94 | 62,846.38 | 39,056.72 | 100,00 |
|  |  | 2,354.76 | 156,931.15 | 115,500.51 | 35,278.65 | 58,368.50 | 974,062.22 | 5,181.35 | 0.00 |
|  |  |  |  |  |  |  | 17,686.43 | 35,183.17 |  |

Accounting Week

FIG. 6C

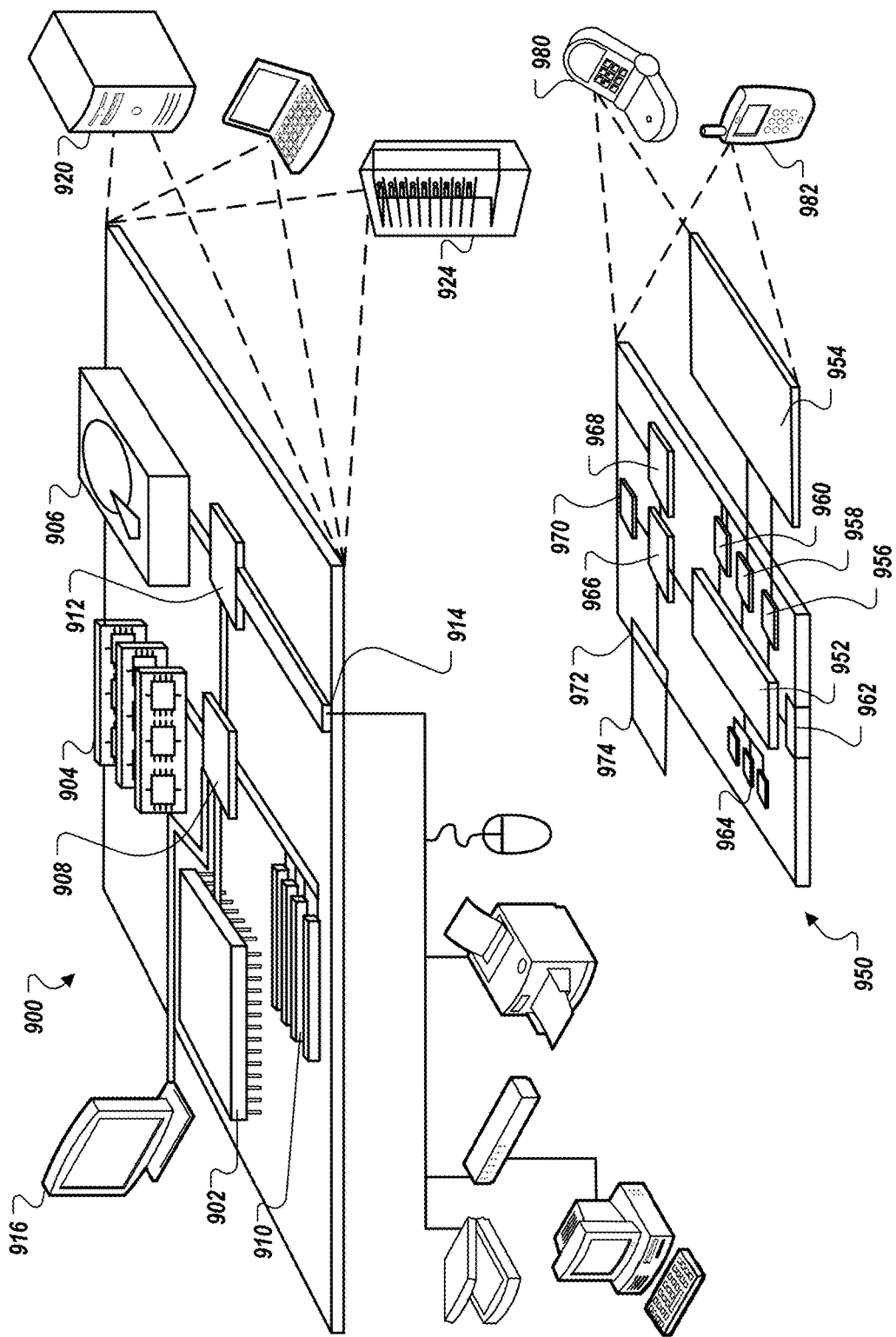

SYSTEMS AND METHODS FOR PREDICTING DEFECTIVE BINS IN AN INVENTORY SYSTEM

INCORPORATION BY REFERENCE

This application claims priority to U.S. Provisional Application Ser. No. 63/335,463, filed on Apr. 27, 2022, the disclosure of which is incorporated by reference in its entirety.

TECHNICAL FIELD

This document describes devices, systems, and methods generally related to identifying defective bins in replenishment networks, such as physical bins (e.g., containers, storage locations), storing inventory in warehouses and distribution centers.

BACKGROUND

A replenishment network can include warehouses and distribution centers that organize and maintain inventory, such as physical items, that can be used to replenish stock in retail environments, such as products that are maintained on shelves in a retail store for purchase by customers. A warehouse can be a storage facility or other location that can receive physical items to be stored for an amount of time before being routed out of the warehouse and to other locations, such as the retail environments or other warehouses. The physical items can be received from various different vendors, suppliers, and other parties in a fulfillment and/or replenishment network. The warehouse can include multiple different areas and/or levels, each area and/or level having multiple storage locations. The warehouse can also have multiple aisles with multiple storage locations. Some warehouses may have cold storage areas or other temperature-based or characteristic-based storage areas. Some warehouses can also have rooms where the physical items can be stored.

The physical items can be moved to storage locations in the warehouse. The storage locations can be physical bins. The physical bins can be containers, crates, boxes, pallets, or another item or structure that can be used to maintain or hold a quantity of the physical items while in storage in the warehouse. Each physical bin can also be assigned or designated an area in the warehouse. In some warehouses, physical items of a same type can be assigned to the same physical bin or bins. Physical items of a same vendor or supplier, as another example, can be assigned to the same physical bin or bins. The physical bins can store different quantities of physical items depending on one or more characteristics, such as a size of the bin and/or a size of the physical item. The physical items can be maintained in their designated/assigned bins until a quantity of the physical items are to be picked to fulfill an order, such as a replenishment order for a retail store. In some warehouses, when a quantity of items in a bin becomes depleted, the remaining quantity of items can be moved to another bin and/or other items can be added to the bin.

SUMMARY

The document generally relates to techniques for predicting defective bins in an inventory system, such as physical bins (e.g., containers, storage locations, etc.), storing inventory in retail environments, stores, warehouses, and/or distribution centers. The inventory system can include a replenishment network, a fulfilment network, or a combination of the replenishment network and the fulfilment network. A fulfilment network can be used for fulfilling or otherwise completing orders made by customers online (which are picked up in store and/or delivered to customers). A replenishment network can be used for replenishing low stock levels in retail environments. More particularly, machine learning models can be trained using existing data about the stores, warehouses, and/or distribution centers to accurately and proactively predict the defective bins. The disclosed techniques can amplify data, such as pick and pull data, that has already been collected as part of an inventory audit trail for use as training data for the machine learning models. The inventory audit trail can be a database table or other data structure that can capture daily interactions between workers and bins in the warehouses and/or distribution centers. Using this data, bins can be identified as likely defective early enough so that bin defectiveness can be fixed before a retail environment places an order for items from those bins. Random auditing of bins in the warehouses and/or distribution centers may indicate when one or more of the bins are defective. However, random auditing may require workers to perform additional tasks in the warehouses and/or distribution centers such as actively auditing one or more bins at random, thereby making random auditing cumbersome and inefficient. Oftentimes, the random sampling may not identify all instances of bin defectiveness throughout the warehouses and/or distribution centers. The random auditing also may not feasibly collect enough data needed to identify patterns of inaccuracies and defects in the warehouses and/or distribution centers.

Moreover, a retail environment, such as a store, can place an order with an inventory network (e.g., for replenishment and/or fulfillment), such as a distribution center, to replenish items that are out of stock in the retail environment. Sometimes, once the order is received at the replenishment network, the order can be canceled because when a worker goes out into the replenishment network to collect the items needed to fulfill the order, the worker may discover that the items are missing or that an insufficient quantity of the items are present. When the order is cancelled, the retail environment may be required to place a new order for the items to be replenished, causing delays in a replenishment process. Cancelling the order can result in delaying replenishment of the retail environment, thereby resulting in increased and/or prolonged out of stock conditions in the retail environment.

The disclosed techniques therefore provide for sampling bins that have pull activities during a predetermined period of time (e.g., a last four weeks) and/or have been flagged with a defective bin activity to predict defective bins. The predictions about defective bins can be used to proactively, efficiently, and accurately fix defective bins to maintain accuracy of the bins. Maintaining accuracy of the bins can lead to lower order cancellations, thereby resulting in timely replenishment.

The data that is sampled can be provided to the models described herein for training using machine learning techniques. Additional features (e.g., predictors) can also be used as training and runtime inputs. For example, the additional features can include, but are not limited to, bin location, item class, item price, item type, amount of time that passed since a last pull, frequency of items being pulled from a location, a last type of pull, a worker involved in a last pull, a putaway type, frequency of pulling a particular item, and/or putaway frequency. By blending the sampled data with these additional features, the disclosed techniques can provide for generating a richer set of training data for models that can accurately and proactively determine defective bins in a warehouse and/or distribution center.

Moreover, the disclosed techniques can be performed to generate and train models for different warehouses and/or distribution centers. The models can be trained based on specific features (e.g., predictors) associated with each distribution center, warehouse, or other site for maintaining item inventories. Values of the features can change on a daily basis depending on which may be optimal for the particular network at a particular time, which means the models can also be dynamically updated/trained on a daily basis. As a result, the models can continue to generate accurate determinations of whether bins are likely to be defective in a particular network. The models can therefore make accurate defective bin predictions based on newly-coming items, which can also reduce the importance of non-seasonal items in the distribution center, warehouse, or other site.

Although the disclosed technology may described in terms of fulfillment and/or replenishment networks, the disclosed technology can be applied to any type of inventory management system for which defective bins can be predicted.

One or more embodiments described herein can include a method for training a model to predict defective bins in a distribution center, the method including: retrieving, by a computing system and from a data store, bin data for a distribution center, the bin data including historical bin activities performed with regard to bins in the distribution center, partitioning, by the computing system, the bin data into testing data and training data, the testing data being selected from the bin data, identifying, by the computing system from among the bins, defective bins in the training data that have been flagged as defective to identify defective bin data, designating, by the computing system, a portion of the training data as defective bin data based on the defective bins, designating, by the computing system, a remaining portion of the training data as non-defective bin data, and iteratively generating and testing, by the computing system, models until a test model is identified that satisfies one or more performance testing criteria. The iteratively generating and testing can include: generating, by the computing system, a model training data set that combines a stratified random sampling of the defective bin data and the non-defective bin data such that the defective bin data comprises N percentage of entries in the model training data set, training, by the computing system, a test model to identify defective bins in the distribution center based on the model training data set, the test model being generated using one or more training parameters, testing, by the computing system, the test model using the testing data, the testing generating an f-score for the test model based on accuracy of the test model in predicting defective bins in the testing data, determining, by the computing system, whether the f-score satisfies the one or more performance training criteria, and in response to the f-score not satisfying the one or more performance criteria, incrementing, by the computing system, a value of N and adjusting at least a portion of the one or more training parameters. The method can also include designating, by the computer system, a portion of the bin data as complete defective bin data and a remaining portion as non-defective bin data, the bin data including the training data and the testing data, generating a complete model training data set that combines all entries of the complete defective bin data and a portion of the non-defective bin data such that the defective bin data covers N percentage of the entries determined in the iterative generating and testing steps, training a runtime model using the complete model training data set and the one or more training parameters determined in the iterative generating and testing steps, and returning, by the computing system, the runtime model.

In some implementations, the embodiments described herein can optionally include one or more of the following features. For example, the method can also include selecting, by the computing system, a predetermined quantity of the testing data, using random sampling, for testing the test model. The predetermined quantity can be 20% of the testing data. The method can also include storing, by the computing system, (i) the N percentage of the entries determined in the iterative generating and testing steps and (ii) the one or more training parameters. The one or more training parameters can include a threshold f-score value.

As another example, the method can also include retrieving, by the computing system, the runtime model for runtime use, receiving, by the computing system, runtime data associated with the distribution center, the data including at least one of bin history data and worker history data, providing, by the computing system, the data as input to the runtime model, and returning, by the computing system, output from the runtime model indicating defectiveness probability scores for bins in the distribution center, a defectiveness probability score indicating a likelihood that a respective bin is defective.

The method can also include ranking, by the computing system, the bins in the distribution center based on the defectiveness probability scores, from a highest defectiveness probability score to a lowest defectiveness probability score, and returning, by the computing system, a subset of the ranked bins that satisfy threshold defective bin conditions for presentation in a graphical user interface (GUI) display at a user device. In some implementations, the method can also include generating, by the computing system, a quantity of bin rank buckets based on availability of labor resources to audit the bins in the distribution center, allocating, by the computing system, subsets of the ranked bins to each of the bin rank buckets, and transmitting, by the computing system, each of the bin rank buckets to user devices of employees in the distribution center for presentation in GUI displays of the respective user devices. In some implementations, ranking, by the computing system, the bins in the distribution center can be based on location data for each of the bins, and each of the bin rank buckets can correspond to a different location in the distribution center.

As another example, the runtime data can include, for each of the bins in the distribution center, at least one of (i) a value indicating how recent the bin was accessed by an employee of the distribution center, (ii) whether an inaccuracy about the bin was reported by the employee, (iii) how many employees access the bin over a threshold period of time, (iv) a propensity of the employees who access the bin to misplace items in the bin or other bins, and (v) a propensity of the employees who access the bin to miss-pick items from the bin or other bins.

As another example, the bin data can include, for each bin in the distribution center, at least one of bin state data, bin location data, bin item data, bin transaction data, and bin pull data. Partitioning, by the computing system, the bin data into testing data and training data can include selecting the testing data based on a random sampling of the bin data. The bin data can include the historical bin activities performed with regards to the bins in the distribution center over a predetermined period of time. The predetermined period of time can be a last 4 weeks.

One or more embodiments described herein can include a method for predicting defective bins in a distribution center, the method including: retrieving, by a computing system, bin data associated with a distribution center in a network of distribution centers, providing, by the computing system, the bin data as input to a model that was trained, using machine learning, to predict defective bins in the distribution center, receiving, by the computing system, output from the model indicating defectiveness probability scores for bins in the distribution center, a defectiveness probability score indicating a likelihood that a respective bin is defective, ranking, by the computing system, the bins based on the defectiveness probability scores satisfying ranking criteria, and returning, by the computing system, a subset of the ranked bins that satisfy threshold defective bin conditions for presentation in a GUI display at a user device.

In some implementations, the embodiments described herein can optionally include one or more of the following features. For example, ranking, by the computing system, the bins based satisfying ranking criteria can include grouping the bins into bin rank buckets based on bin location, each of the bin rank buckets corresponding to a different location in the distribution center. Returning, by the computing system, a subset of the ranked bins can include returning each of the bin rank buckets to user devices of employees in the distribution center. The bin data can include at least one of bin state data, bin location data, bin item data, bin transaction data, bin worker data, and bin pull data. The bin data can also include historical bin activities performed with regard to the bins in the distribution center over a predetermined period of time. The predetermined period of time can be a last 4 weeks. In some implementations, returning, by the computing system, a subset of the ranked bins can include returning a threshold quantity of the bins having defective probability scores above a threshold score value. The threshold quantity can be 25 bins.

As another example, the bin data can include, for each of the bins, at least one of (i) a value indicating how recent the bin was accessed by an employee of the distribution center, (ii) whether an inaccuracy about the bin was reported by the employee, (iii) how many employees access the bin over a threshold period of time, (iv) a propensity of the employees who access the bin to misplace items in the bin or other bins, and (v) a propensity of the employees who access the bin to miss-pick items from the bin or other bins. The method can also include generating, by the computing system, output for presentation in the GUI display at the user device that includes a graphical depiction of average defectiveness probability scores for one or more distribution centers in the network of distribution centers. In some implementations, the method can also include receiving, by the computing system from the user device, bin audit data, the bin audit data including an indication of whether a bin in the subset of ranked bins is actually defective, and updating, by the computing system, the bin data for the audited bin based on the indication of whether the bin is actually defective.

The devices, system, and techniques described herein may provide one or more of the following advantages. For example, the disclosed techniques can be implemented without requiring additional investments to identify defective bins. In other words, the disclosed techniques provide a zero-investment defective bin prediction tool that may not require additional resources, such as workers, for random sampling and/or auditing of bin locations in a warehouse and/or distribution center to then predict the defective bins. Instead, the disclosed techniques can leverage existing inventory audit trails as sample data for training the machine learning models described herein. The inventory audit trails can include an abundance of pick data, pull data, and other types of data associated with the warehouses and/or distribution centers that can be used to accurate and proactively predict bin defectiveness.

As another example, the disclosed techniques can be beneficial to support bin cleansing strategies, improve bin accuracy, and reduce store order cancels. As a result, the disclosed techniques can minimize or otherwise eliminate downstream out of stock conditions in retail environments by providing proactive auditing of bins in the warehouses and/or distribution centers using existing data about the bins (as provided in inventory audit trails) and on-time retail environment replenishment. The disclosed techniques can provide for ensuring quantities of items are available for the shelves in the retail environment based on projected forecasts for item demand in that retail environment. As a result, sales can be maintained and improved by reducing and/or otherwise avoiding out of stock conditions in the retail environment.

The disclosed techniques can also provide for dynamically generating and training models that are unique to each warehouse and/or distribution center. The models can accurately predict defective bins based on factors or conditions that are specific to a particular warehouse and/or distribution center.

Moreover, the disclosed techniques can be used to assist warehouses and/or distribution centers in identifying root causes of defects or other quality issues in such networks. Using machine learning techniques, features can be identified that drive or otherwise cause defective bins in a warehouse and/or distribution center. For example, a Gini score (e.g., coefficient, ratio) can be determined using the disclosed techniques as a relative measure for identifying features that are more likely to cause the defects in the warehouses and/or distribution centers. For example, if pull frequency data over a last 90 days is identified as a top feature in predicting defects and a hit rate (e.g., defect percentage obtained by auditing predicted bins) exceeds a threshold range for a particular warehouse and/or distribution center, then further analysis of data for bins across this feature can help leaders or other relevant stakeholders at the particular warehouse and/or distribution center identify a root cause of their defects. By studying such features and identifying root causes, solutions for eliminating the root causes can be more readily discerned and applied to improve accuracy and efficiency in the warehouses and/or distribution centers.

The details of one or more implementations are set forth in the accompanying drawings and the description below. Other features and advantages will be apparent from the description and drawings, and from the claims.

BRIEF DESCRIPTION OF THE DRAWINGS

FIG. 5 is example output illustrating predicted defective bins in a distribution center.

FIGS. 6A-F are example outputs illustrating predicted defective bins for different distribution centers.

FIG. 9 is a schematic diagram that shows an example of a computing device and a mobile computing device.

Like reference symbols in the various drawings indicate like elements.

DETAILED DESCRIPTION OF ILLUSTRATIVE EMBODIMENTS

Figure 1:
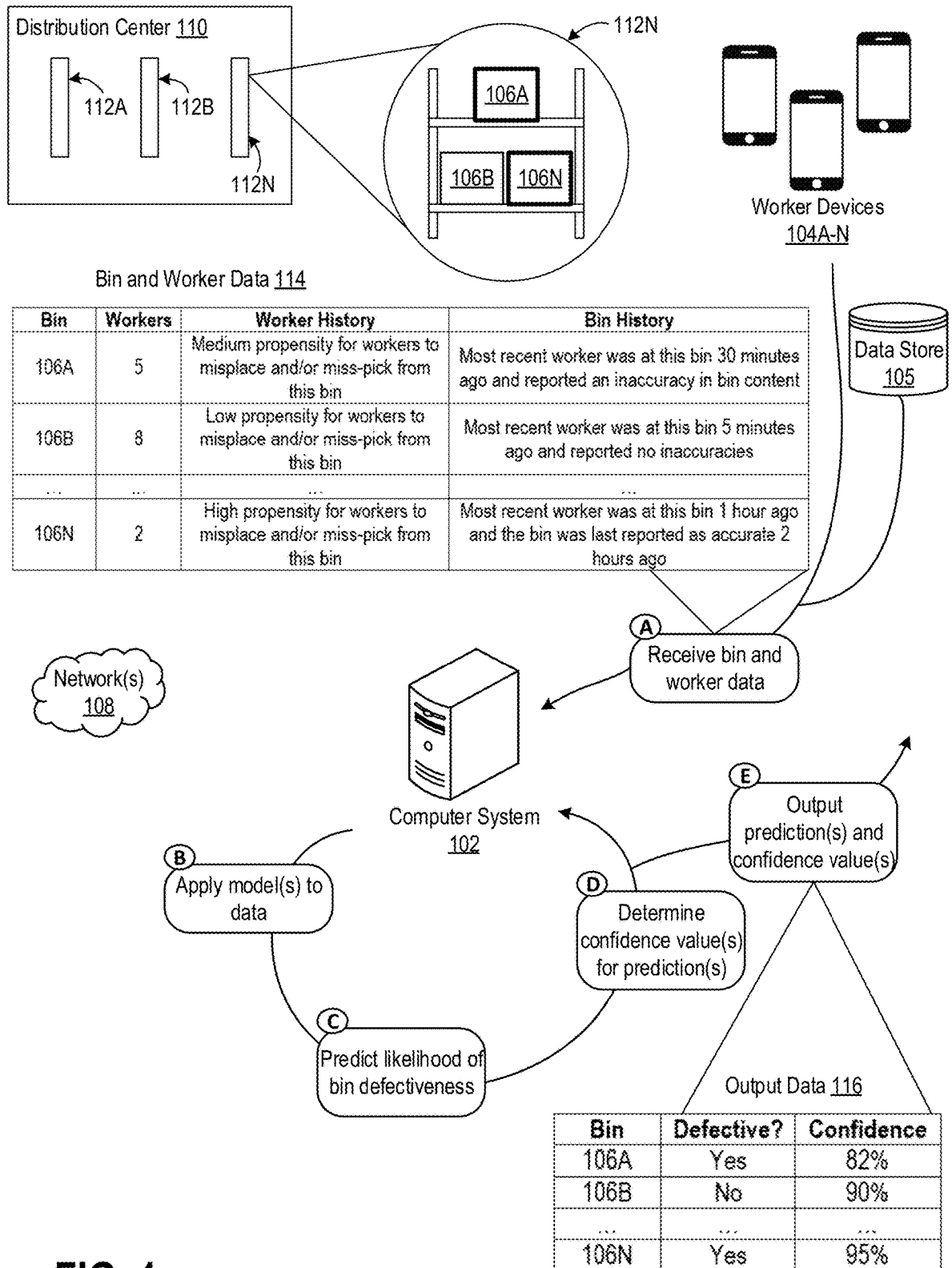
FIG. 1 is a conceptual diagram for predicting defective bins in a distribution center.

This document generally relates to techniques for predicting defective bins in inventory systems of warehouses, distribution centers, stores, retail environments, or other sites that maintain item inventors. As described throughout this disclosure, the inventory systems can include, but are not limited to, fulfilment networks and replenishment networks. Data that is recorded as part of an inventory audit trail can be used to train machine learning models that can predict defective bins in a particular warehouse and/or distribution center. Certain activities that are recorded in the inventory audit trail and carried out by workers in the warehouses and/or distribution centers can act as indicators of defective bins. Such indicators can be analyzed by the machine learning models to identify and predict defective bins in the warehouses and/or distribution centers.

For example, location holds, inventory adjustments, and/or store order label cancels can appear in the inventory audit trail for a particular warehouse and/or distribution center and may indicate a high probability that a corresponding bin is defective. In brief, a location hold is when a worker puts a particular bin (e.g., location) on hold if they suspect something is wrong with item(s) and/or quantity of item(s) in that particular bin. This bin may not be accessibly for other operations to be performed until the hold is released. Inventory adjustments can include recorded adjustments (e.g., increases or decreases) in items and/or units in a particular bin. Sometimes, inventory adjustments can include resolving location holds in which a worker can adjust the items and/or units in a bin that was put on hold and then release the hold. Inventory adjustments can include cycle counts, in which a worker adjusts the items and/or units in a bin as part of routine cycle counts and/or verification audits. Inventory adjustments can also include consolidation efforts, in which a worker adjusts the items and/or units in a bin as part of a consolidation task. Inventory adjustments may also include item correction and/or expiration efforts, in which a worker adjusts an incorrect Vendor Case Pack (VCP)/Store Ship Pack (SSP) and/or updated expired items in a particular bin. In brief, the VCP can indicate a minimum number of units shipped from a vendor to the warehouse and/or distribution center. The SSP indicates a minimum number of units shipped to a retail environment. As an illustrative example, when a vendor ships a pack of soft drinks with 40 units to a warehouse, the VCP is 40. When the warehouse ships a pack of the soft drinks with 8 units to a store, the SSP is 8. Thus, one VCP of the soft drinks contains 5 SSPs of the soft drinks.

Store order label cancels can refer to instances when a retail environment places an order to a warehouse and/or distribution center to be replenished within a stipulated amount of time and then that order is canceled by the warehouses and/or distribution centers. The order can be canceled due to a variety of reasons, but in terms of the disclosed techniques, orders that are cancelled due to bin and/or item inaccuracies (e.g., shortage in a unit quantity in a particular bin) can act as an indicator for predicting defective bins in the warehouses and/or distribution centers.

Moreover, a warehouse and/or distribution center can be a distribution center, such as a storage facility or warehouse. A defective bin can be a shelf, rack, or other location in the warehouses and/or distribution centers that has an incorrect item and/or incorrect units. An incorrect item can, for example, be a missing item or an unexpected item. Missing items may be items intended to be located in the bin but are in fact not found in the bin. Unexpected items may be items found in the bin that are not intended to be located in the bin. Incorrect units can be shortages in unit counts of an item in the bin or an overage in unit counts of an item in the bin.

Referring to the figures, FIG. 1 is a conceptual diagram for predicting defective bins in a distribution center 110 (e.g., replenishment network, warehouse, fulfillment network, etc.). A computer system 102, worker devices 104A-N, and data store 105 can communicate (e.g., wired and/or wireless) via network(s) 108. In brief, the computer system 102 can be configured to predict defective bins in the distribution center 110. The computer system 102 can be remote from the distribution center 110. For example, the computer system 102 can be a cloud-based service. Moreover, the computer system 102 can be configured to predict defective bins in one or more different distribution centers associated with a particular business, organization, company, or other entity. The worker devices 104A-N can be mobile devices, smart phones, computers, laptops, tablets, and/or one or more other types of user devices. The worker devices 104A-N can be used by workers in the distribution center 110 to track their activities as they perform tasks in the distribution center 110. For example, a worker can be tasked with auditing items in one or more bins in the distribution center 110. Results or other data from the worker's audit can be inputted via the worker device 104A-N and uploaded to the data store 105 and/or the computer system 102. These results or other data can then be used by the computer system 102 to train machine learning models to predict defective bins and/or as input to the machine learning models during runtime. The data store 105 can be a database, cloud-based storage, or other storage device/system that can store data about the distribution center 110, such as inventory audit trails. Data that is logged/inputted by the workers at the worker devices 104A-N can be stored in the data store 105 for later retrieval and use by the computer system 102.

The distribution center 110 can be a storage facility, warehouse, or other type of replenishment network or fulfillment network. The distribution center can include racks 112A-N, which can be used to store items, such as products to be shipped to a retail environment when the retail environment submits a store replenishment order to the distribution center 110. The items can be placed in bins 106A-N. The bins 106A-N can be assigned locations in the racks 112A-N, and contain quantities of a particular item, units, and/or multiple different items. As described throughout this disclosure, workers can be tasked with picking and/or pulling items from any of the bins 106A-N in the distribution center 110. The workers can also be tasked with auditing any of the bins 106A-N and/or items in the bins 106A-N. The workers can log information about the tasks they perform with respect to the bins 106A-N using their worker devices 104A-N, which can then be stored in the data store 105 and used by the computer system 102 to predict which of the bins 106A-N in the distribution center 110 are likely defective.

In the example of FIG. 1, bins 106A and 106N on the rack 112N are actually defective. The disclosed techniques can be used to predict that the bins 106A and 106N are defective, as described below. For example, during runtime, the computer system 102 can receive bin and worker data 114 from the worker devices 104A-N and/or the data store 105 (block A). The computer system 102 can use the data 114 to predict what bins in the distribution center 110 are likely defective.

The bin and worker data 114 can include a variety of information that may be recorded by workers as they complete their assigned tasks in the distribution center 110. For example, the data 114 can include, for each bin 106A-N in the distribution center 110, a quantity of workers who access the bin, worker history, and bin history. In some implementations, as shown in FIG. 1, the worker history can indicate a propensity for workers to misplace and/or miss-pick items from the bin. The bin history can also indicate how recent a worker was last at the bin, when information was last validated or verified for the bin, and indications of whether any content of the bin was identified as inaccurate (e.g., item type, item quantity, etc.).

Additionally or alternatively, other information can be received in block A, such as location holds, inventory adjustments, store order label cancels, other worker activity data, item activity data, and/or other bin activity data that are part of inventory audit trails for the distribution center 110. Information about a particular worker who replenishes or picks items at a bin can be an indicator of whether the bin is defective. As an illustrative example, if that worker puts laptops in bin A5 instead of bin A7 every three out of 10 tasks associated with bin A5, then bin A5 can have a 30% increased chance of being defective. Moreover, in some implementations, any bin that the particular worker interacts with can be assigned a 30% increased chance of being defective, simply because the particular worker has a propensity to misplace items in bins.

In block B, the computer system 102 can apply one or more models to the data 114. In some implementations, the computer system 102 can determine which model(s) to apply based on the distribution center 110. As described further below (e.g., refer to FIGS. 2 and 4A-B), a defective bin prediction model can be generated for each distribution center based on factors/features that are unique/specific to that distribution center.

By applying the model(s) to the data in block B, the computer system 102 can predict likelihoods of bin defectiveness (block C). For example, the model(s) can generate output indicating a likelihood of defectiveness for each of the bins 106A-N in the distribution center 110. The output can be a Boolean value such as True/False and/or Yes/No. The output can also be a numeric value, such as a confidence value that indicates a likelihood of being defective per bin.

The computer system 102 can then determine a confidence value for each defective bin prediction in block D. In some implementations, block D can be performed as part of block C. For example, the model(s) can generate output indicating, for each bin 106A-N, (i) whether the bin is likely defective and (ii) a numeric value indicating confidence of the likelihood of defectiveness. The confidence value can be determined based at least in part on the bin and worker data 114. For example, a bin that is associated with a high propensity for workers to misplace items in the bin can have a higher confidence value that the bin is defective in comparison to a bin that is associated with a low propensity for workers to misplace items therein.

Moreover, the computer system 102 can output the predictions and/or confidence values in block E. The output can be used by relevant stakeholders to resolve potential issues in the distribution center 110 before retail environment replenishment orders are placed. For example, a worker can be sent to the bin 106N to resolve any issue that causes the bin 106N to be defective before a retail environment submits an order for items from the bin 106N. If the defectiveness of the bin 106N is proactively resolved, replenishment orders for items in the bin 106N may not be cancelled or otherwise delayed when they are received by the distribution center 110.

The output can vary depending on what user is viewing/receiving the output. For example, a manager of the distribution center 110 may receive output indicating the predicted defectiveness and corresponding confidence value for every bin 106A-N in the distribution center. As another example, a manger of multiple distribution centers may receive output indicating a total quantity of predicted defective bins per distribution center. One or more other output can be generated in block E. Refer to FIGS. 5-7 for example outputs.

As shown in FIG. 1, output data 116 can include, for each bin 106A-N in the particular distribution center 110, an indication of whether the bin is defective and a confidence value associated with that indication. Here, the computer system 102 determine that bins 106A and 106N are likely defective and bin 106B is not. Bin 106A has a defective confidence value of 82%, bin 106B has a non-defective confidence value of 90%, and bin 106N has a defective confidence value of 95%. The predictions and confidence values in the output data 116 correlate with the actual state of the distribution center 110 previously described, in which bins 106A and 106N are in fact defective and bin 106B is not. The bin 106N may have a higher defective confidence value than the bin 106A because the bin 106N, according to the bin and worker data 114, has a high propensity for workers to misplace and/or miss-pick items from the bin 106N (whereas the bin 106A has a medium propensity). Moreover, the defective confidence value can be higher for the bin 106N than the bin 106A because more workers tend to the bin 106A and the bin 106A was checked more recently than the bin 106N. Although the bin 106A was recently reported as having an inaccuracy, the bin 106N was not recently checked for accuracy. Therefore, the defective confidence value for the bin 106N is higher than for the bin 106A because there is less certainty about the accuracy of the bin 106N. Moreover, the non-defective confidence value for the bin 106B can be a high value (e.g., closer to 100%) because the bin 106B is associated with a low propensity for workers to misplace and/or miss-pick items, the bin 106B was most recently checked by a worker, and no inaccuracies were reported for the bin 106B.

Figure 2:
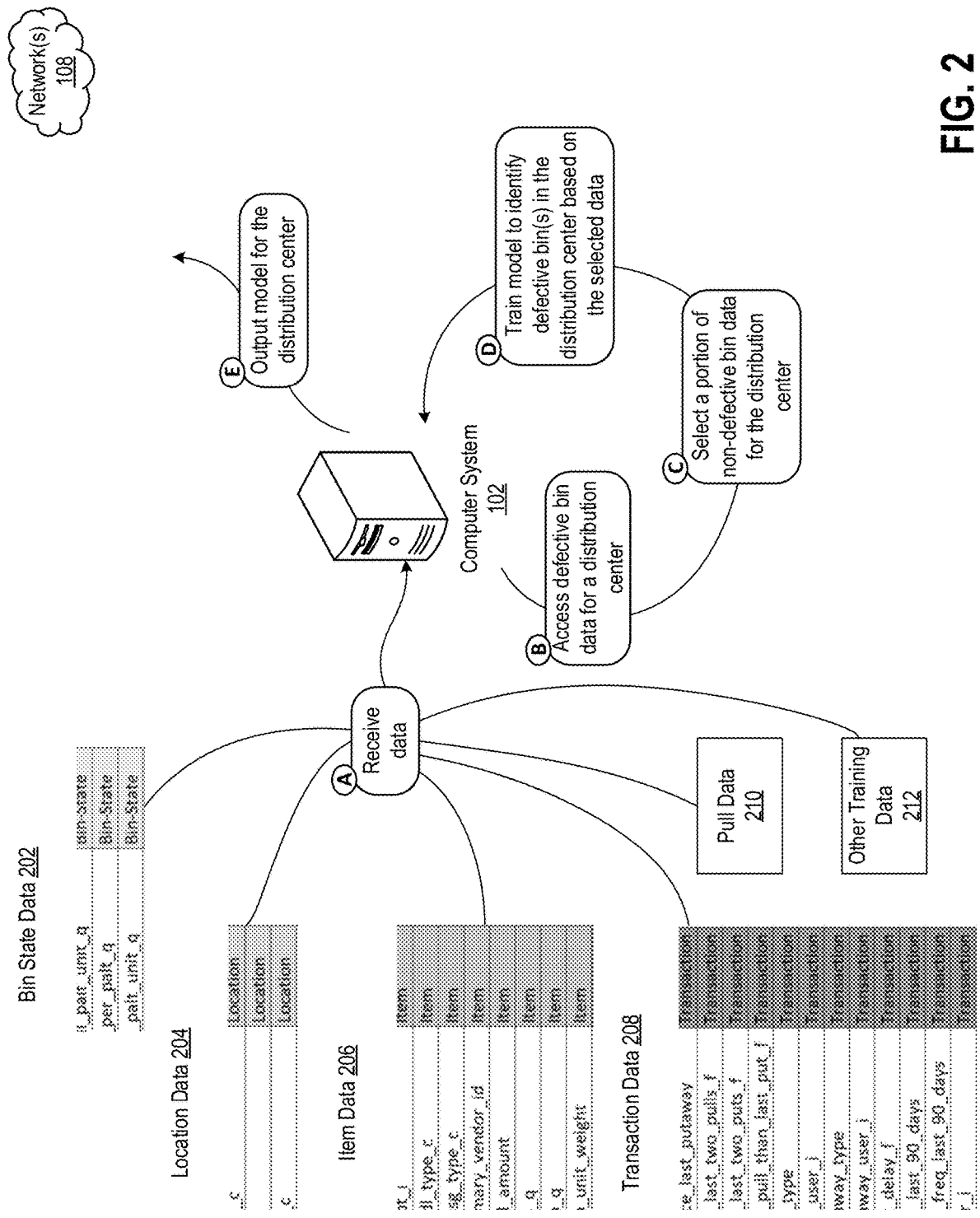
FIG. 2 is a conceptual diagram for training models to predict defective bins in distribution centers.
Figure 4A:
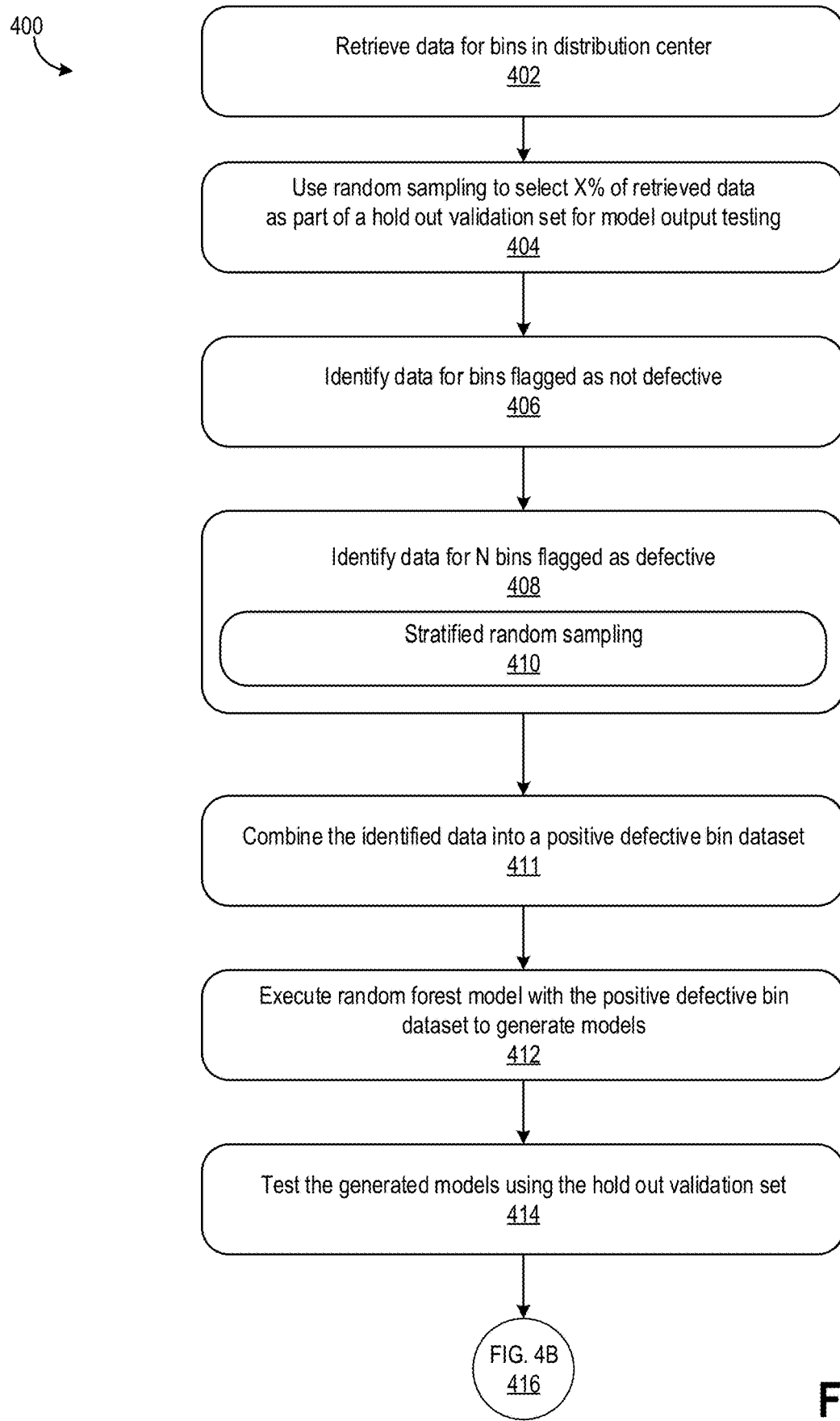
FIGS. 4A-B is a flowchart of a process for training a model to predict defective bins in a distribution center.
Figure 4B:
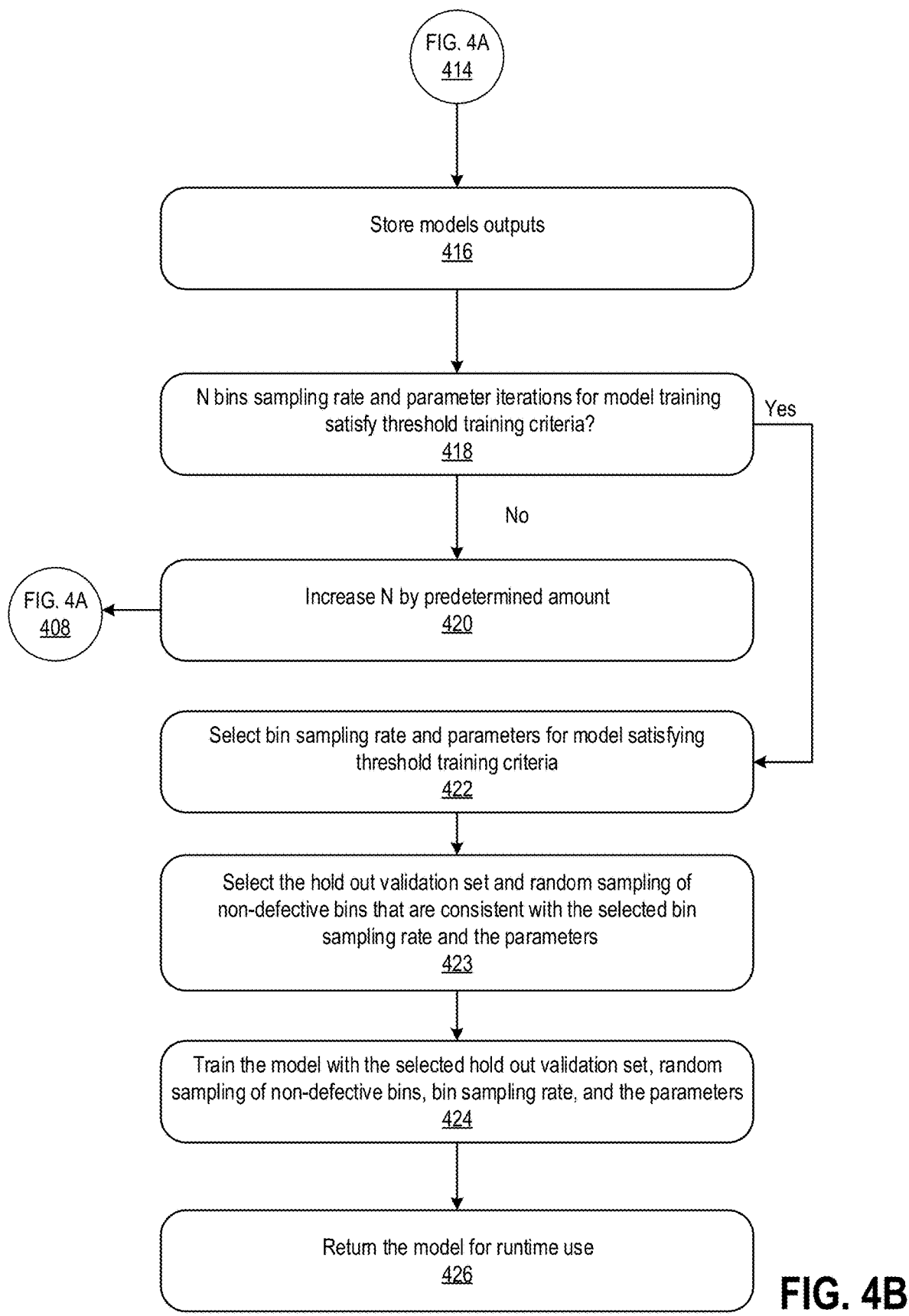

FIG. 2 is a conceptual diagram for training models to predict defective bins in distribution centers. Training can be performed by the computer system 102. In some implementations, training can be performed by one or more other computer systems 102. As described herein, the computer system 102 can generate and train a model per distribution center. Accordingly, the training process described in FIG. 2 can be performed by the computer system 102 for each distribution center. Different data and/or features unique to a distribution center can be used for individually training a model such that the model can accurately predict defective bins based on conditions specific to the distribution center. Refer to FIGS. 4A-B for additional discussion about training the models.

The computer system 102 can receive data in block A. The data can be received from the data store 105 and/or the worker devices 104A-N, as described in reference to FIG. 1. The data can include, but is not limited to, bin state data 202, location data 204, item data 206, transaction data 208, pull data 210, and/or other training data 212. The other training data 212, for example, can include activity data associated with workers in a distribution center. For example, the computer system 102 can receive data for all bins that had a pull action in a past 4 weeks. The computer system 102 can retrieve any additional data about the bins that were pulled, including but not limited to the item data 206 and the bin location data 204.

As an illustrative example, some of the transaction data 208 received in block A can include lag time between pulling items from a bin and getting the pulled items to a door/outbound location in the facility (e.g., pull_dvrt_delay_f) and a user who received a pulled item (e.g., rcpt_user_i). Some of the bin state data 202 can include a count of how many items are in a bin (e.g., dcpi_count), a count of units available per pallet that can be pulled at any time (e.g., palt_avail_palt_unit_q), a number of cartons per pallet that can be pulled at any time (e.g., palt_ctn_per_palt_q), and/or a count of items per pallet that can be pulled at any time (e.g., palt_pull_palt_unit_q). One or more other types of data can be received in block A, as depicted and described herein. For example, the received data can include class of items pulled, cost of items pulled, types of items pulled, items that are missing from a bin, frequency of pulling items from a bin in a day, a last type of pull (e.g., packing, unpacking, put same item in same bin or different bin, etc.), who last pulled an item from a bin, what was a putaway type, who put the last item in the bin, whether an item was pulled but not diverted for some period of time (e.g., lagged on a conveyor belt for a period of time), frequency of pulling the item over a last 90 days, and/or putaway frequency.

The computer system 102 can sample data for all bins having pull activities over a past 4 weeks, as described above. Pull activity can indicate frequency of a bin being touched to replenish items for a store order. Moreover, bins with pull activities over the past 4 weeks can be selected because 4 weeks can represent a preferred amount of time for sampling amidst frequent changes to bin data based on new activities occurring at the bin. After all, bin states can keep changing over time.

The computer system 102 can flag a bin as defective (e.g., Yes/No) based on whether a defect indicator activity is associated with the bin in the pull activities. As described in reference to FIG. 1, the defect indicator activity can include location holds, inventory adjustments, and/or store order label cancels in an inventory audit trail associated with the bin. The bin can be flagged as defective based on the defect indicator activity because auditing every bin in a distribution center for true defects can be impractical, inefficient, and timely. As an example, if 100 pull activities occur in a distribution center and 10 of those bins had any type of defective event following the pull, these 10 bins can be considered defective, meaning a base defect rate would be 10%. Hence, defect indicator activity can be assumed as a defect and thus a more efficient way to sample data for training purposes. Although false positives may arise, additional techniques can be performed by the computer system 102, as described herein and FIGS. 4A-B, to resolve the false positives.

In block B, the computer system 102 can access defective bin data for a particular distribution center. The computer system 102 can select bins that have been flagged as defective in the particular distribution center, as described in reference to block A. As described above, data that involves location holds, inventory adjustments, and store order label cancels may be likely or high indicators of defective bins and thus accessed in block B.

In block C, the computer system 102 can select a portion of non-defective bin data for the distribution center. As described further in FIGS. 4A-B, the computer system 102 can use random sampling techniques to select a predetermined percentage or quantity of the non-defective bin data in block C. The selected portion of non-defective bin data can be combined with the selected defective bin data to generate a dataset (e.g., 50% positive dataset) for training purposes.

The computer system 102 can then train a model to identify defective bins (e.g., predict likelihood that a bin is defective) in the particular distribution center based on the data that was selected in blocks B and C (block D). As described in FIGS. 4A-B, the computer system 102 can use random forest modeling and/or tree-based modeling to train the model to identify defective bins. For example, decision trees can be grown by randomly selecting one or more features from the data that was selected in blocks B and C. The results from all of the trees can be aggregated to make a decision (e.g., whether a bin is defective or not). How many trees are grown can vary and be determined dynamically based on the selected features.

In some implementations, the computer system 102 can also validate the model identifications using the pull data 210 that was received in block A. The pull data 210 can validate whether a bin is in fact defective or not defective. Therefore, the pull data 210 can be used for accurately validating the model identifications. In some implementations, the computer system 102 can validate the model identifications using a hold out validation set. The hold out validation set can include defective bin data and non-defective bin data (e.g., 50% defective data and 50% non-defective data) that is not used for training the model but rather is used to validate the model once trained. The computer system 102 can generate the hold out validation set in block A, upon receiving the data described above. Refer to FIGS. 4A-B for further discussion about validating the model identifications. The computer system 102 can iterate through blocks B-D until the model is validated. For example, as described further in FIGS. 4A-B, the computer system 102 can iteratively increase a quantity of non-defective bin data that is selected in block C, combine that data with the defective bin data from block B, and retrain the model in block D.

In some implementations, the computer system 102 can train a new model each time that the computer system 102 iterates through the blocks B-D. The computer system 102 can then select a model that outputs a highest percentage of accurate defective bin predictions as part of the validation process. The selected model can then be used during runtime for the particular distribution center.

The computer system 102 can output the model for the particular distribution center for runtime use in block E. As described herein, the computer system 102 can select a best model for the distribution center. The outputted model can then be used to predict defective bins in real-time based on current bin data for the distribution center.

Moreover, the computer system 102 can iteratively improve the model over time as inventory audit trails are updated with new information for the particular distribution center. In some implementations, the computer system 102 can iterate training across different parameter settings each day (or at other predetermined time intervals) and select a best or preferred model to use during runtime for that day.

Accordingly, a distribution center can execute a different model each day based on different parameters that are relevant to activities in the distribution center for that day.

To avoid cross-distribution center influence, data associated with each distribution center can be independently fed into the computer system 102 to train a model per distribution center. After all, even differences such as work culture differences can cause a distribution center to have varying defective bin patterns and/or varying root causes of bin defectiveness.

Figure 3:
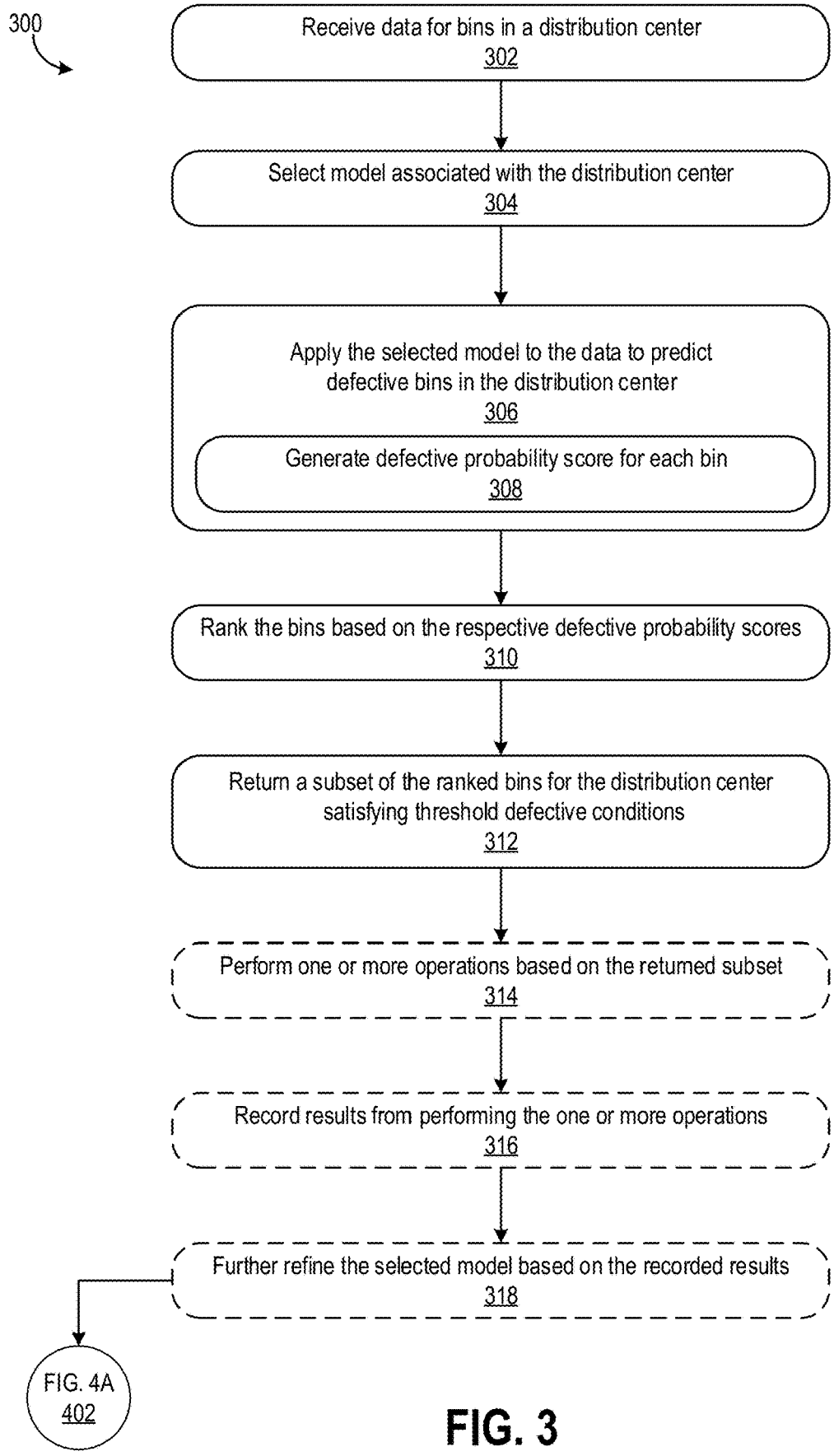
FIG. 3 is a flowchart of a process for predicting defective bins in a distribution center.

FIG. 3 is a flowchart of a process 300 for predicting defective bins in a distribution center. The process 300 can be performed by the computer system 102. The process 300 can also be performed by one or more other computing systems, devices, computers, networks, cloud-based systems, and/or cloud-based services. For illustrative purposes, the process 300 is described from the perspective of a computer system.

Referring to the process 300, the computer system can receive data for bins in a distribution center in block 302. Therefore, current bins with their respective predictors (e.g., data) can be received. Similar to receiving data when training a model in FIG. 2, the computer system can receive predictors such as pull data for bins in the distribution center over a past 4 weeks. The data received in block 302 can include any of the types of data described in FIGS. 1-2 (e.g., bin state data 202, location data 204, item data 206, transaction data 208).

In block 304, the computer system can select a model associated with the distribution center. For example, the computer system can select a best model for the distribution center for that particular day or other period of time. The computer system can also select a model that satisfies threshold prediction criteria (e.g., prediction accuracy is above a predetermined threshold value or range). In some implementations, the computer system can select the model based on what type of data is received in block 302.

Next, the computer system can apply the selected model to the data to predict defective bins in the distribution center (block 306). The received data can be provided as input to the model. Using the techniques described herein, the model can generate predictions of whether bins represented by the inputted data are defective or not. Output from the model can include indications of whether each bin is defective or not (e.g., string values and/or Boolean values such as Yes/No, True/False, Defective/Not-Defective).

Output from the model can also include a confidence value representing a likelihood that each bin is defective. For example, in block 308, the computer system can generate a defective probability score for each bin. The probability score can be the confidence value that is generated by the model. In some implementations, the model can generate, as output, the probability score for each bin. In some implementations, the computer system can generate the probability score based on output from the model. The probability score can be a numeric value on one or more scales, such as 0 to 100. 100 can represent a highest likelihood that the bin is defective and 0 can represent a lowest likelihood that the bin is defective. In some implementations, 100 can represent a highest confidence that the bin is defective and 0 can represent a lowest confidence that the bin is defective. One or more other scales can be used for determining the probability score for each bin.

The computer system can rank the bins based on the respective defective probability scores in block 310. The bins can be ranked from highest to lowest probability score.

In block 312, the computer system can return a subset of the ranked bins for the distribution center that satisfy threshold defective conditions. For example, the computer system can return a subset of ranked bins that have probability scores that are greater than a threshold range or value. The computer system can return, for example, a list of top 10 ranked bins. One or more other threshold defective conditions can be used to return the subset of the ranked bins. For example, the computer system can return a list of top 20 ranked bins. In some implementations, the computer system can return a full list of the ranked bins. The returned subset of ranked bins can be presented at a user device of a relevant user in the distribution center. For example, the relevant user may review the subset of ranked bins and instruct workers in the distribution center to perform audits on the ranked bins and document results from those audits. Thus, defective bins can be remedied in the distribution center.

As another example, the computer system can create rank buckets for the distribution center in block 312. The computer system can create rank buckets of 25 consecutive ranked bins. For example 100 bins can be ranked. Bins ranked from 1-25 can be added to a rank bucket 1 and ranked from 1 to 25 within the bucket, highest defect probability to lowest defect probability. Bins ranked from 26-50 can be added to a rank bucket 2 and ranked from 1-25 within the bucket. Bins ranked from 51-75 can be added to a rank bucket 3 and ranked from 1-25 within the bucket. Bins ranked from 76-100 can be added to a rank bucket 4 and ranked from 1-25 within the bucket. One or more of the rank buckets 1 through 4 can then be returned and reviewed by the relevant user in the distribution center. In some implementations, a user in the distribution center can retrieve/access 2 rank buckets (25-50 ranked bins) in a day. The user can retrieve fewer or more rank buckets based on available resources (e.g., other relevant users) in the distribution center. The bins in the retrieved bucket can be sorted based on bin identifier (ID) and location in the distribution center (e.g., sorted in ascending order of bin ID). The user can then travel to each of the bin locations in the order in which they are sorted. Therefore, the user can efficiently audit the bins in order while optimizing travel distance in the distribution center. Once the bins are audited, the user can provide results from their audits to the computer system. The computer system can use the results to generate reports about the bins in the distribution center. Such reports can be used to better understand/analyze the performance of the distribution center, allow distribution center users to research and fix/respond to repetitive defects by modifying existing processes, and understand a dollar amount of sales gained (which otherwise may be lost due to out of stock conditions if a user has not fixed defects that are predicted by the model).

Optionally, the computer system can perform one or more operations based on the returned subset in block 314. For example, the computer system can generate auditing tasks to be presented at devices of workers in the distribution center. The tasks can request the workers to review the bins that are ranked in the subset and to document whether those bins are in fact defective. As another example, using feature importance techniques, the computer system can identify features (e.g., predictors, data) that may cause some, many, and/or most defects of bins in the distribution center. The computer system can also generate a Gini score, which can be a relative measure used by the relevant user(s) to identify features having more influence over causing defects in the distribution center than other features. Moreover, the computer system can generate output, for presentation to the relevant user(s), which indicates different features and their influence over causing bin defects in the distribution center. Such output can show most influential features over time to help the relevant user(s) identify root causes in bin defects in the distribution center.

Optionally, the computer system can also record results from performing the one or more operations in block 316. As described above, the workers can provide input at their respective devices indicating whether or not they identify the ranked bins in the subset as defective. Any information logged by the workers during their audits can be recorded by the computer system in block 316. The recorded information can then be used for future predictions of defective bins and/or continuous training of the selected model and other models.

Optionally, the computer system may further refine the selected model based on the recorded results in block 318. As mentioned above, the recorded results can be used to improve accuracy of the selected model in predicting defective bins. The recorded results may also be used for model validation purposes as described in FIG. 2. To refine the selected model based on the recorded results, the computer system can proceed to process 400 described in FIGS. 4A-B.

FIGS. 4A-B is a flowchart of a process 400 for training a model to predict defective bins in a distribution center. As described herein, the process 400 can be performed to curate a robost training dataset that considers both bins that are flagged as defective and a random sampling of bins that are not flagged as defective. The process 400 can include, for example, undersampling negative cases (e.g., bins that are flagged as non-defective, which, in an illustrative example, can be 98% of all bins in a distribution center) such that accuracy of the model predictions are not weighted down as heavily by the negative cases. By considering representation from both defective and non-defective bins, a model trained by the process 400 can have a higher positive defective rate. Stratification techniques can be used to generate a robust and good representation of all bins, both flagged as defective and non-defective. The data selected for training purposes can be stratified based on a variety of filters, such as item type, item category, and/or department. The process 400 can be performed more than once per distribution center. For example, the process 400 can be performed once a day per distribution center to take into account current changes to bin data in the distribution center. As another example, the process 400 can be performed twice a day (e.g., once in the morning and once in the evening), every other day, every three days, every 12 hours, every 6 hours, etc.

The process 400 can be performed by the computer system 102. The process 400 can also be performed by one or more other computing systems, devices, computers, networks, cloud-based systems, and/or cloud-based services. For illustrative purposes, the process 400 is described from the perspective of a computer system.

Referring to the process 400, the computer system can retrieve data for bins in a distribution center in block 402. The computer system can retrieve all data for all bins that are flagged as defective and/or not defective in the distribution center. The data can be retrieved for a last 4 weeks. In some implementations, the computer system can also clean the retrieved data so that the retrieved data can be consumed by machine learning models, algorithms, and other techniques described herein.

In 404, the computer system can use random sampling to select X % of the retrieved data as part of a hold out validation set. The hold out validation set can include data that is used for the purpose of testing (e.g., validating) model output. For example, using random sampling techniques, the computer system can select 20% of the retrieved data to be added to the hold out validation set. As another example, the computer system can select 1%, 2%, 3%, 4%, 5%, 10%, etc. of the data to be added to the hold out validation set. The hold out validation set can be used for testing the model output after model training. The hold out validation set can be made up of 50% defective bin data and 50% non-defective bin data, in some implementations.

In block 406, the computer system can identify data in the remaining retrieved data for bins flagged as not defective. Over a last 4 weeks, a distribution center can have a defect rate (e.g., percent of bins flagged as defective) between 0.5% and 2%. Since this means that approximately 98% of bins may be flagged as non-defective, the computer system can undersample the bins flagged as non-defective to generate a more balanced dataset for training purposes.

In block 408, the computer system can identify data in the remaining retrieved data for N bins that are flagged as defective. The computer system can use stratification techniques and/or stratified random sampling (block 410). N can be a portion of the bins that is less than all of the bins flagged as defective. With stratified random sampling, a total population of the bins flagged as defective can be divided into smaller subgroups or strata. The strata can be formed based on shared attributes or characteristics of the bins. Stratified random sampling therefore allows for obtaining a sample population of the negative cases that best represents an entire population of the negative cases to generate a more balanced training dataset.

In block 411, the computer system can combine the identified data into a positive defective bin dataset. This dataset can, for example, be a 50% positive defective bin dataset. By retrieving all cases of defective bins and a smattering of other cases of non-defective bins, as an example, the training dataset can have stronger signals of accuracy since the cases of defective bins may not be drowned out by an abundance of the other cases of non-defective bins.

In block 412, the computer system can execute random forest modeling with the positive defective bin dataset to generate one or more models. In the example above, the computer system can run a random forest model with the identified defective bin data and the identified non-defective bin data. For example, the computer system can mix the stratified random sample of defective bin data (blocks 408-410) with the identified defective bin data (block 406) in such a way that the defective bin data forms 10% of the positive defective bin dataset used to generate the models in block 412. Random forest parameters can also be set and used for training purposes.

The computer system can also test (e.g., validate) the generated model(s) using the hold out validation set (block 414). In other words, the computer system can test the model output using the selected X % of data in the dataset from block 404. In the example above, the computer system can test each of the models generated in block 412 with the 20% of the data in the dataset that was selected in block 404. The computer system can execute the testing with varying parameters. The computer system can continue looping through model training as the defective bin data is incremented by a predetermined amount or percentage of the positive defective bin dataset. The predetermined amount or percentage can be 2%. For example, the computer system train the models with the positive defective bin dataset having 10% defective bin data (and thus 90% non-defective bin data), then 12% defective bin data (and 88% non-defective bin data), then 14% defective bin data (and 86% non-defective bin data), etc. until a threshold percentage of defective bin data is satisfied. The threshold percentage can be 20% in some implementations. In some implementations, the computer system can start with training the models with the positive defective bin dataset having 20% defective bin data (and 80% non-defective bin data), then decrement that percentage by 2% until a threshold percentage is satisfied, such as 10% defective bin data (and 90% non-defective bin data).

The computer system can also continue looping through model training until threshold random forest parameters are satisfied. For example, the computer system can train the models with 50 decision trees, incremented by 50 until there are 300 decision trees. Additionally or alternatively, the computer system can train the models with 3 random variable selections, incremented by 1 until 16 random variable selections are made in a loop of model training. One or more other threshold random forest parameters can be generated and used to loop through the model training. By looping through model training using various threshold random forest parameters, many models can be generated for the distribution center to accurately predict defective bins in the distribution center.

The computer system can store the model(s) output(s) in block 416. In some implementations, the output can include precision scores and/or f-scores, which can be used for identifying and determining a best model for a particular distribution center. The output can be stored in a data store or other type of database, as described throughout this disclosure.

In block 418, the computer system can determine whether N bins sampling rate and parameter iterations for model training satisfy threshold training criteria. For example, the computer system can determine whether the N bins is less than a threshold quantity. If, as an illustrative example, N is less than a total quantity of bins that are flagged as not defective and/or the parameter iterations are not satisfied, then the computer system can increase N by a predetermined amount in block 420 and then return to block 408. Therefore, each iteration of training in the loop can also include testing/validating model training output with the same hold out validation set.

The computer system can increase N by 2% or some other predetermined numeric value or percentage, as described above with regards to looping through model training. The process 400 can continue to repeat as N is incrementally increased in each iteration by 2% (or the other predetermined numeric value or percentage) until the threshold training criteria is satisfied in block 418. Incrementally growing the training dataset by undersampling different quantities of the negative cases and implementing various parameter iterations can be advantageous to train models to accurately predict defective bins. Similarly, the computer system can determine whether the threshold random forest parameters are satisfied, as mentioned above in reference to looping through model training. Once the threshold training criteria is satisfied, the computer system can proceed to block 422.

In block 422, the computer system can select the bin sampling rate and parameters for the model satisfying the threshold training criteria. For example, the computer system can identify the bin sampling rate and parameters that resulted in the model having a highest f-score or f-measure. The model may, for example, have been trained with 10-12% of positive cases (e.g., bins flagged as defective) and 90% of negative cases (e.g., bins flagged as non-defective). The model can be identified using an f-score weighted precision model. The f-score or f-measure, which can be outputted by each model and stored in block 416, can be a measure of the model's accuracy. The f-score can be calculated from precision and recall of the model during training, where precision can indicate a number of true positive results divided by a number of all positive results (including those not identified correctly) and recall can indicate a number of true positive results divided by a number of all bins that should have been identified as positive cases. With this statistical modeling approach, the computer system can add more weight to precision versus recall when analyzing and comparing the f-scores for the models. In some implementations, the computer system can select the sampling rate and parameters for a model having an f-score of at least 0.5.

In some implementations, the computer system can select the sampling rate and parameters for model having a best positive percent split and a best iteration parameters by selecting the model having the highest f-score. Moreover, sometimes the computer system can also execute a refit process, in which the computer system can run a new random forest model with new training data obtained by splitting and stitching the positive defective bin dataset of block 411 with the best positive percent split and applying the best iteration parameters. This refit process can be beneficial to make use test data that was not used in training previous iterations of the models. The new random forest model can then be saved as the model to be used for runtime use Next, the computer system can select the hold out validation set (block 404) and a random sampling of non-defective bins that are consistent with the selected bin sampling rate and the selected parameters (block 423).

The computer system can train the model with the selected hold out validation set, random sampling of the non-defective bins, the bin sampling rate, and the parameters in block 424.

The computer system can return the trained model for runtime use in block 426. The model can then be used to predict defective bins in the distribution center using current date pull data (joined with additional fields of data like those used in training, such as item data and bin location data) for the distribution center.

As described herein, the process 400 can be performed at predetermined times, such as every day (e.g., once a day), to generate an updated and precise model for a particular distribution center. The process 400 can also be individually performed for each distribution center such that data pertaining to one distribution center does not affect generation of a model for another distribution center.

FIG. 5 is example output 500 illustrating predicted defective bins in a distribution center. The output 500 can be presented in a graphical user interface (GUI) at a user device. The output 500 can be presented to a relevant user or users of a distribution center, replenishment network, and/or network of distribution centers. Here, the output 500 presents defective bin predictions for a particular distribution center identified with an ID (e.g., dc_i) of 3801. In some implementations, the relevant user can filter or sort the output 500 by distribution center, such that the relevant user can view defective bin predictions for one or more other/different distribution centers.

In some implementations, the output 500 can be transmitted to the relevant user in a reporting email, notification, or other type of alert that can be presented at the user's device. For example, the relevant user may receive a reporting email every day (or at other predetermined time intervals) indicating that defective bins have been predicted for a particular distribution center. The relevant user can then click a link in the reporting email to be presented with the output 500.

The output 500 can present a list of defective bins having highest defective probabilities (e.g., the probability scores described in FIG. 3) or defective probabilities that are within a threshold range. In some implementations, the output 500 can present all defective bins that have been predicted for the distribution center. Here, the output 500 presents the predicted defective bins sorted based on location. In other words, the predicted defective bins are sorted based on a smallest path of travel to and between the bins. The bins are therefore sorted based on their location so that a relevant user who audits the bins may travel to the bins in the order in which they are presented in the output 500 and therefore take the smallest path of travel. This can provide for efficient auditing of the predicted defective bins.

The probabilities of defectiveness are represented as decimal values, where a value closest to 1 indicates a highest probability and a value closest to 0 represents a lowest probability. The probabilities can also be presented as other values, such as percentages.

For each bin, the output 500 can include information such as a corresponding distribution center, last date of running the prediction algorithm on the bin, last hour of running the prediction algorithm, a bin location ID, a bin area, an aisle of the bin, a specific bin within the aisle, a level in the aisle (e.g., 0 represents a floor location, 1 represents 1 level up on a rack, 2 represents 2 levels up on the rack, etc.), a bin ranking (which is assigned to the bin based on the defect probability as predicted by the prediction algorithm), bin rank bucket, and the bin defective probability. As described herein, bins can be grouped together into buckets. 25 consecutively ranked bins, for example, can be grouped together into a rank bucket. The rank bucket can then be exported with information about the 25 ranked bins so that those bins can be audited in order by the relevant users in the distribution center. The grouping of bins into rank buckets can depend on availability of resources. For example, if 4 users are available to audit defective bins, then 50 bins (e.g., first 2 buckets) can be exported and sorted according to bin location ID, then audited in that sequence. As another example, if 2 users are available, then 25 bins (e.g., first 1 bucket) can be exported, sorted according to bin location ID, then audited in that sequence.

In some implementations, the output 500 can also be filtered based on bin ranking categories. The bin location ID can be expanded into location information such as an aisle location, bin location, or other bin location, thereby making it easier for relevant users to digest the information presented in the output 500 and determine where defective bins are located in the distribution center.

FIGS. 6A-F are example outputs illustrating predicted defective bins for different distribution centers. Similar to the output 500 in FIG. 5, the outputs described in FIGS. 6A-F can be presented in GUIs for one or more relevant users.

Figure 6A:
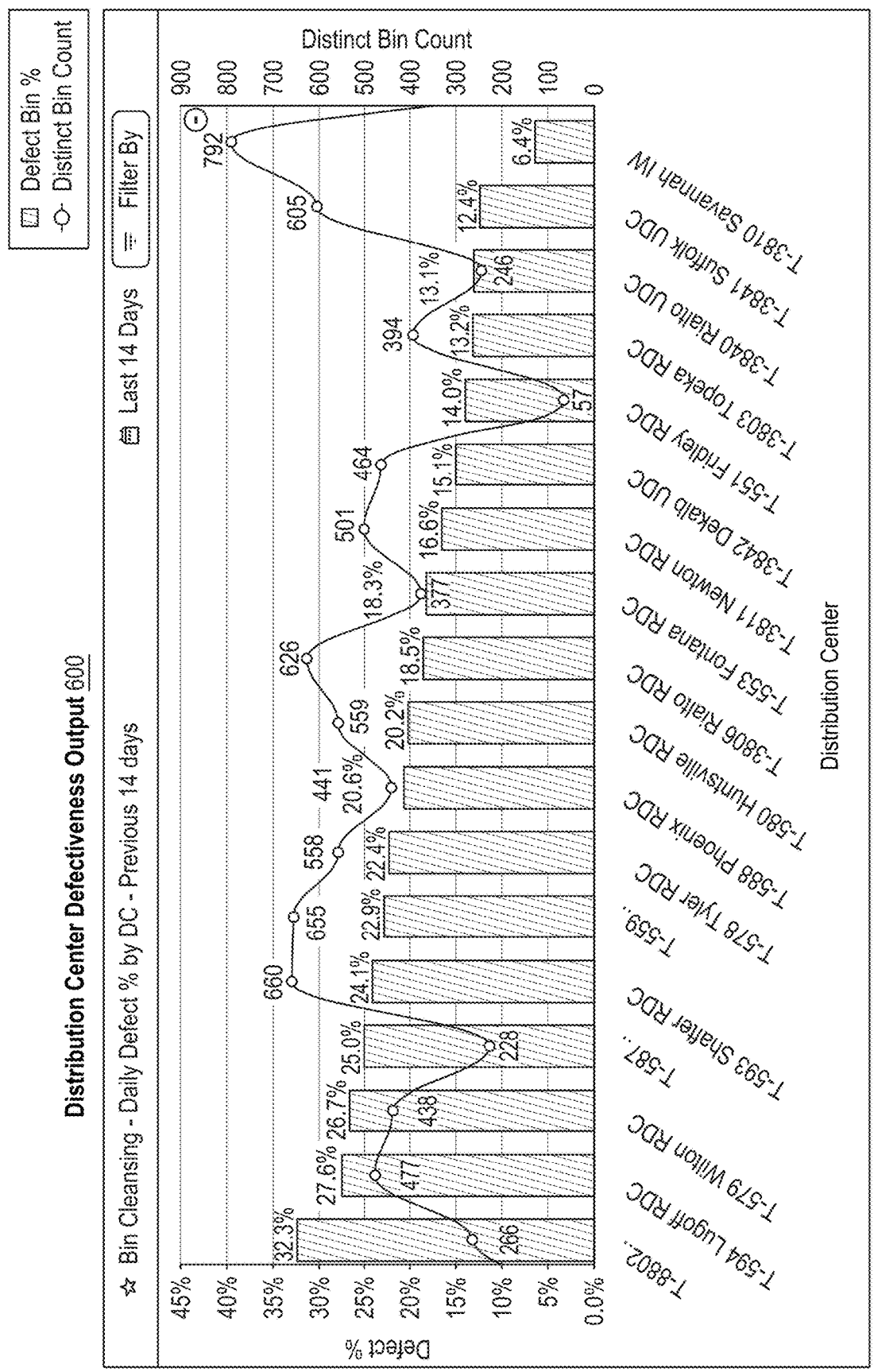
Figure 7:
FIG. 7 is another example output illustrating predicted defective bins for different distribution centers.

In FIG. 6A, the output 600 is a graphical depiction of total defective bins per distribution center in a network of distribution centers over a 14 day period. The output 600 can be useful to view/determine how distribution centers perform relative to each other and which distribution centers may require additional auditing/review.

As shown in the output 600, typically the more distinct bins that a distribution center has, the higher percentage of predicted defective bins. Some outliers may exist, as shown on the ends of the output 600, such as with distribution center "T-3810 Savannah IW."

In FIG. 6B, output 602 represents a percent of weekly bin defects across 8 weeks for all distribution centers in a network of distribution centers. The output 602 can be presented in a table, as shown. Each row represents a different distribution center in the network. Each column represents a week in which defective bins were predicted across the distribution centers. Each entry can be represented in a different indicia (e.g., shading, color) that corresponds to a percent of defective bins. The indicia can be assigned based on the percent of defective bins such that a smaller percentage can result in an entry being represented in a first indicia (e.g., a white box/color, a light shade of blue, etc.) and a larger percentage can result in an entry being represented in a second indicia (e.g., a darker color, a darker shade of blue, etc.).

FIG. 6C depicts output 604. The output 604 provides a tabular view of weekly unit DPMO across 8 weeks for all the distribution centers in the network. The output 604 is similar to the output 602 in FIG. 6B with regards to how information is displayed therein.

Figure 6D:
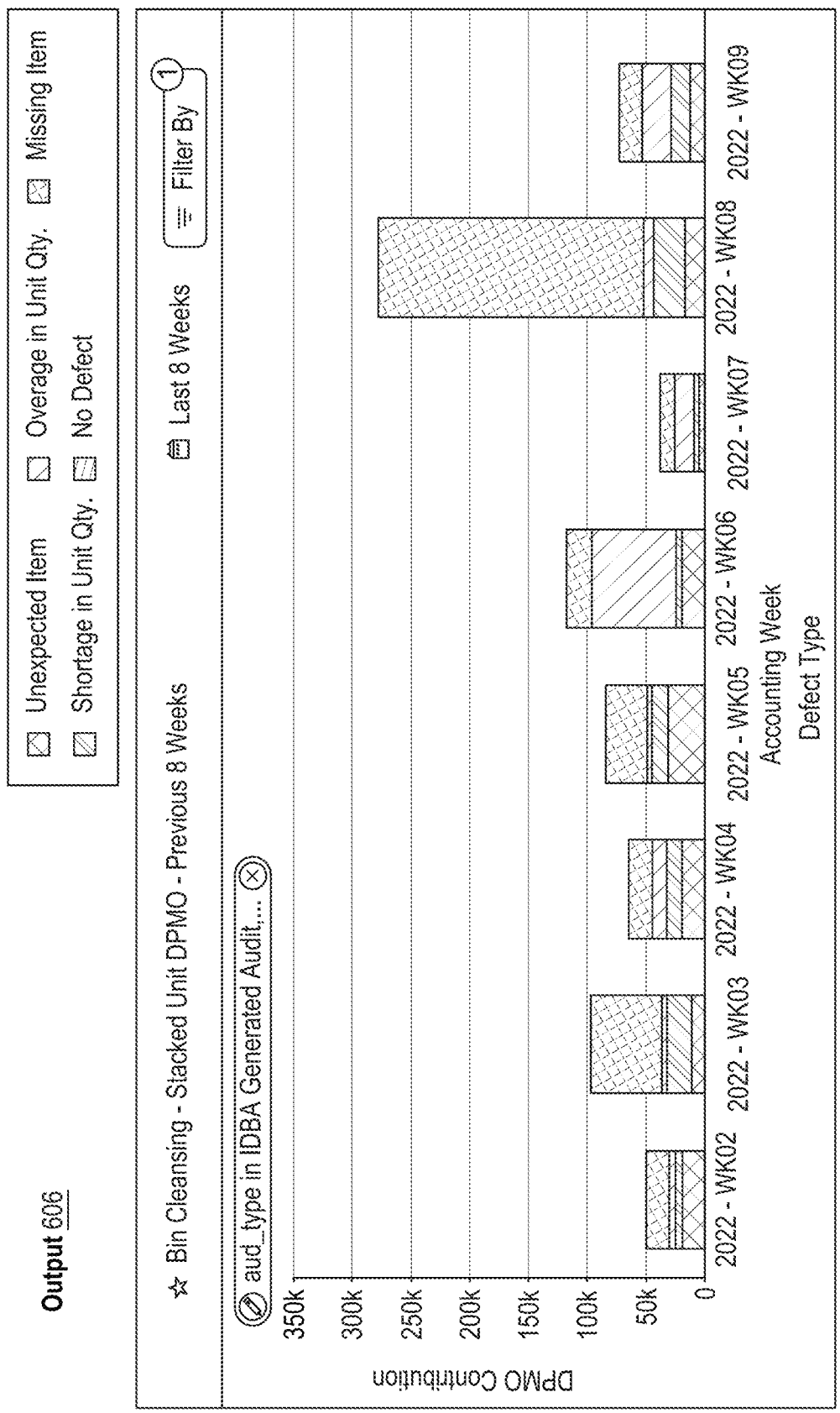

FIG. 6D shows output 606, which provides a graphical view of weekly unit DPMO categorized by defect type across 8 weeks for all the distribution centers in the network. The different defect types can include, but is not limited to, unexpected items, shortage in unit quantity, overage in unit quantity, no defect, and missing items. One or more other defect types can also be used and selected by the relevant user when filtering what information is presented in the output 606. Each bar in the graph represents the weekly unit DPMO as aggregated for all the distribution centers for a particular week.

Figure 6E:
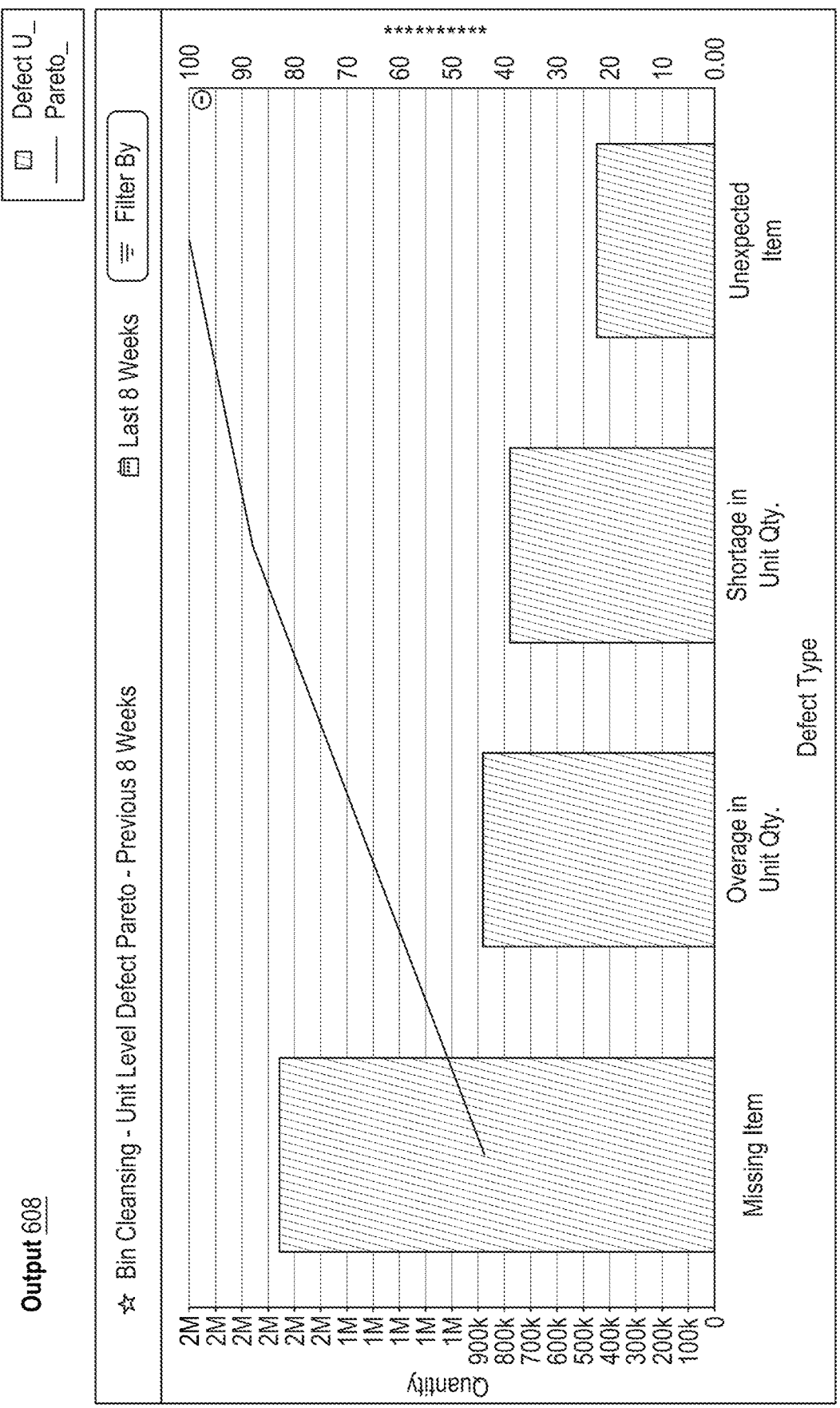

FIG. 6E shows output 608, which provides a graphical view of units of different defect types for a period of 8 weeks. Each bar in the graph represents a different defect type. The defect types include but are not limited to missing item, overage in unit quantity, shortage in unit quantity, and unexpected item. One or more other defect types can also be displayed in the output 608. The one or more other defect types can be defined and/or selected by the relevant user viewing the output 608.

Figure 6F:
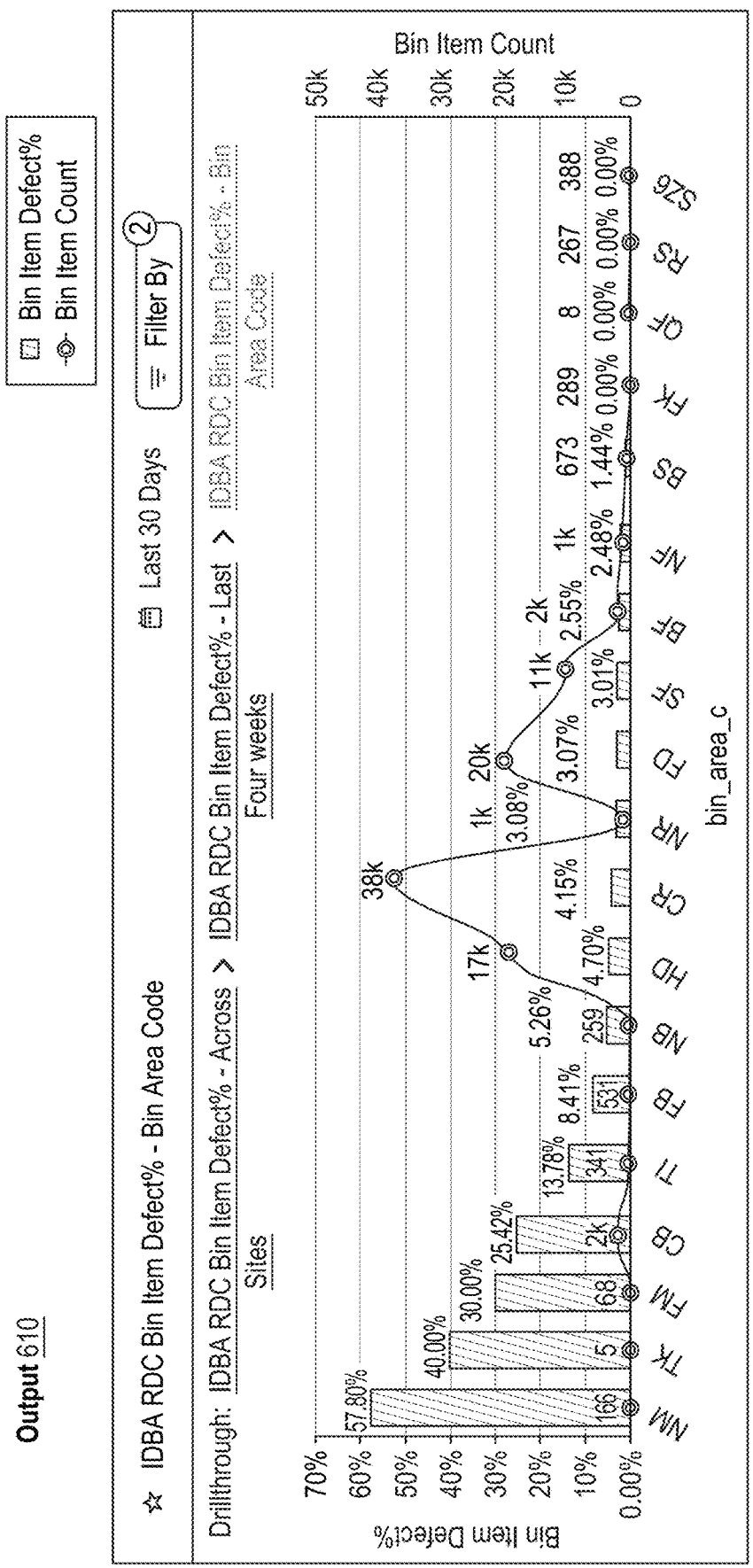

In FIG. 6F, output 610 depicts feature analysis based on bin area code in a graphical format. The output 610 is specific to a particular distribution center, represented by ID 3802. Here, the output 610 is shown over 4 weeks. The percent of predicted defective bins across bin area codes can help relevant users to research and understand bins in a particular bin area code where bins are audited and defective. More particularly, this helps relevant users understand why bins in the NM area code were 57.8% defective of the 166 bins audited were in fact defective. Other similar visualizations, as described and depicted herein, can help the relevant users understand the percent of defective bins across various other features to help improve the distribution centers and reduce bin accuracies therein.

Although the FIGS. 6A-F illustrate output for 14 days or 8 weeks, the output can be adjusted to show results for any other predetermined period of time, including but not limited to 5 days, 7 days, 9 days, 10 days, 12 days, 4 weeks, 5 weeks, 6 weeks, 10 weeks, 12 weeks, 14 weeks, 20 weeks, 24 weeks, 32 weeks, etc. For example, the relevant user can sort or filter the information presented in the outputs of FIGS. 6A-F by selecting a desired amount of time that predictions were made using the disclosed techniques. Moreover, although the FIGS. 6A-F illustrate output for all distribution centers in a network, the output can also be adjusted to show results for particular distribution centers of interest to the relevant user, different networks of distribution centers, and/or distribution centers across different networks.

FIG. 7 is another example output 700 illustrating predicted defective bins for different distribution centers. Similar to the outputs shown and described in FIGS. 5-6, the output 700 can be presented in GUIs for one or more relevant users. The output 700 demonstrates overall bin defectiveness per distribution center. In some implementations, the output 700 can be a dashboard with visualizations for quality bin cleansing across various distribution centers (e.g., a network of distribution centers). Auditors can view the output 700 and other output described herein to see which bins have been predicted as defective and to track those bins audited locations. Using the output 700 and other output described herein, managers at distribution centers can lead research activities that identify process gaps causing bin inaccuracies. Moreover, head quarter management can use the output 700 and other output described herein to track progress in each distribution center as they work on their bin cleaning efforts.

The output 700 presents information in an "IDBA Visualization" tab 702, which hosts a variety of visualizations depicting data generated by auditing bins in the distribution centers using the disclosed techniques.

The tab 702 presents a graphical element 704 (e.g., circle) showing a percent of predicted defective bins for all the distribution centers over some period of time (e.g., a prior week, represented as "Defect %"). The percent of predicted defective bins is determined by dividing a defect quantity by an expected quantity of bins, then multiplying the returned value by 100 to generate the percentage. The percent of predicted defective bins measures defective bins on a unit level.

The tab 702 also presents a graphical element 706 (e.g., circle) showing a Defects per Million Opportunities (herein, DPMO) for all the distribution centers over some period of time. This value is similar to the percent of predicted defective bins except the DPMO measures defects per million (instead of 100). The DPMO can also measure defects at the unit level.

As an illustrative example, when 10 bins (e.g., suppose 10 units per bin) are audited and a bin #4 has a 3 unit shortage and a bin #3 has a 2 unit shortage, in total there are 5 units in shortage (considering no other bins are defective). Therefore, only 2 bins out of 10 are audited as being defective. The percent of predicted defective bins can be determined using the following formula: (2/10)*(100) to determine that the percent of predicted defective bins is 20%. The unit DPMO can be determined using the following formula: (5/100)*(1,000,000) to determine that the DPMO is 50,000.

The output 700 can also present charts, tables, or other graphical elements indicating a percent of predicted defective bins per distribution center over a previous period of time (e.g., a previous 8 weeks). A relevant user can therefore compare the percentages across all distribution centers on a weekly basis to determine how each distribution center performs relative to each other. The output 700 can also be used to determine whether each distribution center improves over time (such as by reducing an amount of defective bins, which can occur by auditing the defective bins and correcting issues with the audited bins).

Moreover, the output 700 can include one or more additional tabs 708A-N that can be selected by the relevant user to view additional or other information. For example, the user can select tab 708A to view data about predicted defective bins in a tabular form. The user can select tab 708B to view auditor errors. The user can select tab 708C to view and access information about predicted defective bins, such as their audit location information. The user can select tab 708D to view information about retail monetary values that are tied to the defective bins that are fixed during audits. The user can select tab 708E to view feature importance plots associated with the training data described herein.

The outputs shown and described in FIGS. 5-7 are non-limiting examples of information that can be presented to relevant users about defective bin predictions. One or more other forms of output can also be generated and presented in GUIs to the relevant users.

Figure 8:
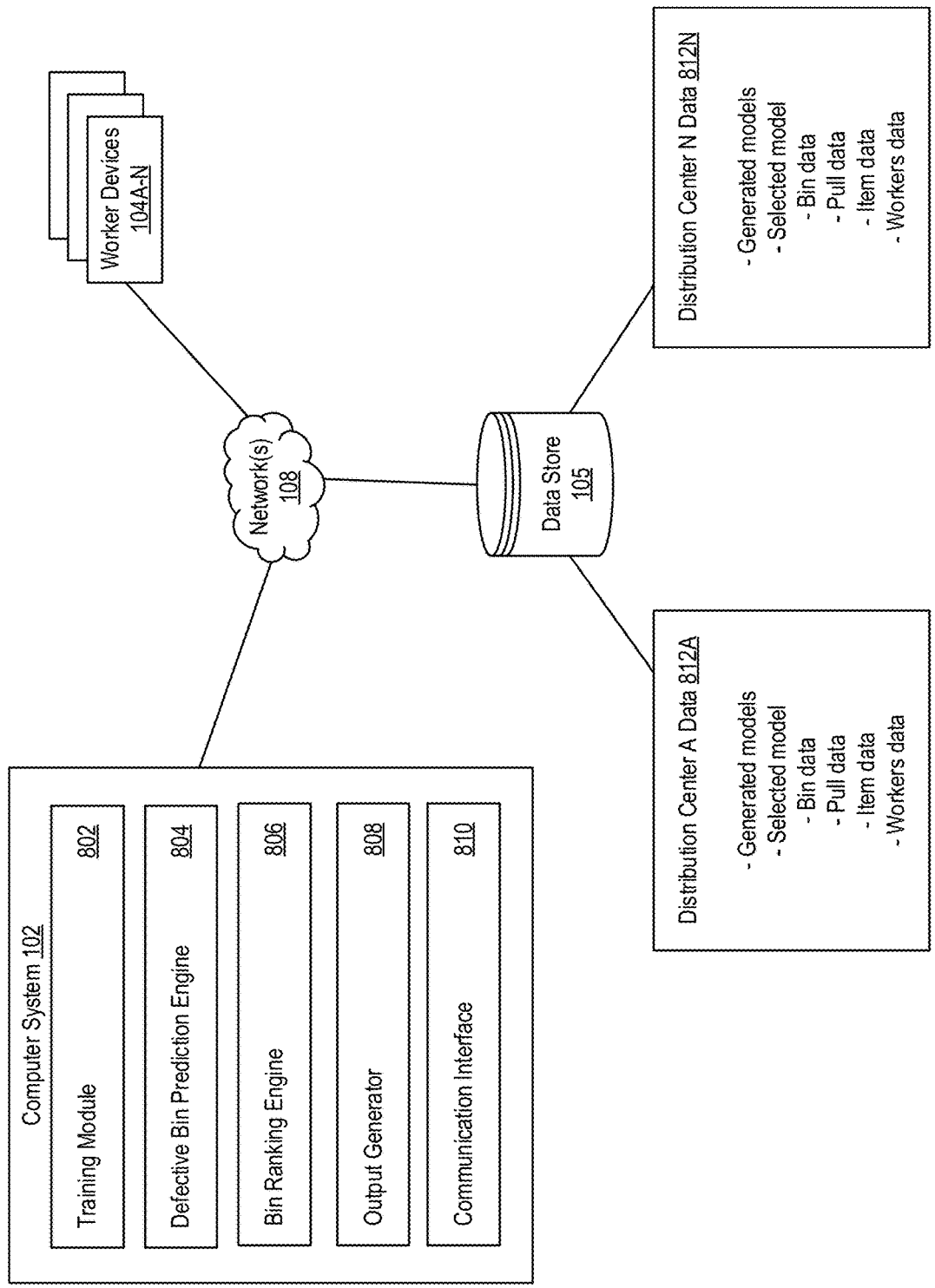
FIG. 8 is a system diagram depicting components that can be used to perform the techniques described herein.

FIG. 8 is a system diagram depicting components that can be used to perform the techniques described herein. The computer system 102, worker devices 104A-N, and data store 105 can communicate via the network(s) 108.

The computer system 102 can be configured to train models that predict defective bins and execute the models to predict defective bins in distribution centers. The computer system 102 can predict defective bins in each distribution center in a network of distribution centers using a model that was generated and trained specifically for the distribution center. In some implementations, the computer system 102 can predict defective bins for a set of distribution centers in the network of distribution centers and another computer system can predict defective bins for another set of distribution centers in the network. In some implementations, the computer system 102 can predict defective bins in one distribution center in the network and other computer systems can predict defective bins for other distribution centers in the network. Moreover, in some implementations, one or more other computer systems can generate and train the models for one or more distribution centers in the network.

The computer system 102 can include a training module 802, a defective bin prediction engine 804, a bin ranking engine 806, an output generator 808, and a communication interface 810. The training module 802 can perform the techniques described in FIGS. 2 and 4A-B. The training module 802 can be configured to generate and train models for predicting defective bins in each distribution center. The defective bin prediction engine 804 can perform the techniques described in FIGS. 1 and 3. The defective bin prediction engine 804 can, for example, be configured to use one of the models generated by the training module 802 to predict defective bins in a particular distribution center at a certain period of time (e.g., on a daily basis). The bin ranking engine 806 can perform some of the techniques described in FIGS. 1 and 3 and can be configured to generate lists of defective bins per distribution center based on highest to lowest defectiveness probability scores. The output generator 808 can be configured to generate output to be presented to relevant users, such as workers at the worker devices 104A-N. The output generator 808 can generate, for example, any of the output depicted and described in FIGS. 5-7. Finally, the communication interface 810 can provide communication between the components described in FIG. 8.

The worker devices 104A-N can be any type of user device and/or computing device that can be used by relevant users in a distribution center and/or network of distribution centers. The worker devices 104A-N can include, but are not limited to, laptops, tablets, mobile devices, smartphones, cellphones, or other types of computing devices. The worker devices 104A-N can include input devices (e.g., keyboards, mice, touchscreens, haptic devices, microphones, etc.) for receiving input from the relevant users (e.g., such as audit reviews by workers in a distribution center). The worker devices 104A-N can also include output devices (e.g., display screens, speakers, haptic devices, etc.) for presenting information to the relevant users (e.g., such as the output generated by the output generator 808). The worker devices 104A-N can also include communication interfaces to provide for communication between the components described herein.

The data store 105 can be a database, cloud-based storage, or other data repository/storage system. The data store 105 can store information about each distribution center, including but not limited to information about bins in each distribution center, items in each distribution center, and workers in each distribution center. For example, the data store 105 can store distribution center data 812A-N. Each of the data 812A-N can include, for the corresponding distribution center, generated models, a selected model (e.g., a selected model for a particular period of time, such as a day, models that have been selected over time for different periods of time, etc.), bin data, pull data, item data, and workers data. The data 812A-N can also include any of the data described throughout this disclosure, such as the bin state data 202, the location data 204, the item data 206, the transaction data 208, the pull data 210, and the other training data 212 depicted and described in FIG. 2. One or more other type of data that can be used for training purposes may also be stored and accessible in the data store 105. Similarly, one or more other type of data that can be used for defective bin predictions during runtime can be stored in the data store 105.

FIG. 9 shows an example of a computing device 900 and an example of a mobile computing device that can be used to implement the techniques described here. The computing device 900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the computing device 900. In some implementations, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In the implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. In addition, it can be implemented in a personal computer such as a laptop computer 922. It can also be implemented as part of a rack server system 924. Alternatively, components from the computing device 900 can be combined with other components in a mobile device (not shown), such as a mobile computing device 950. Each of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, and a transceiver 968, among other components. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chipset of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can provide communication with the processor 952, so as to enable near area communication of the mobile computing device 950 with other devices. The external interface 962 can provide, for example, for wired communication in some implementations, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which can include, for example, a SIMM (Single In Line Memory Module) card interface. The expansion memory 974 can provide extra storage space for the mobile computing device 950, or can also store applications or other information for the mobile computing device 950. Specifically, the expansion memory 974 can include instructions to carry out or supplement the processes described above, and can include secure information also. Thus, for example, the expansion memory 974 can be provide as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 964, the expansion memory 974, or memory on the processor 952. In some implementations, the computer program product can be received in a propagated signal, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, can include recorded sound (e.g., voice messages, music files, etc.) and can also include sound generated by applications operating on the mobile computing device 950.

The mobile computing device 950 can be implemented in a number of different forms, as shown in the figure. For example, it can be implemented as a cellular telephone 980. It can also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for training and executing a model to identify defective bins in a distribution center, the method comprising:
    retrieving, by a computing system and from a data store, bin data for the distribution center, wherein the bin data includes historical bin activities performed with regard to bins in the distribution center;
    partitioning, by the computing system, the bin data into testing data and training data, wherein the testing data is selected from the bin data;
    identifying, by the computing system from among the bins, defective bins in the training data that have been flagged as defective to identify defective bin data;
    generating, by the computing system, a first training set comprising the identified defective bin data;
    generating, by the computing system, a second training set comprising remaining data in the training data that was not identified as the defective bin data;
    in a first training stage, iteratively generating and testing, by the computing system, models until a test model is generated from the models that satisfies one or more performance testing criteria, the iteratively generating and testing comprising:
        generating, by the computing system, a model training dataset that comprises a combination of (i) the first training set and (ii) the second training set such that the first training set comprises N percentage of entries in the model training dataset,
        training, by the computing system, the test model to identify defective bins in the distribution center based on the model training dataset, wherein the test model is generated using one or more training parameters,
        testing, by the computing system, the test model using the testing data based on accuracy of the test model in identifying defective bins in the testing data,
        determining, by the computing system, whether, based on the testing, the test model satisfies the one or more performance testing criteria,
        based on determining that the test model does not satisfy the one or more performance testing criteria, (i) incrementing, by the computing system, a value of the N percentage of the entries in the model training dataset and (ii) adjusting at least a portion of the one or more training parameters, and
        iteratively performing the training, the testing, the determining, and the incrementing until the test model satisfies the one or more performance testing criteria;
    in response to generating the test model that satisfies the one or more performance testing criteria, generating, by the computer system, a third training set comprising a portion of the bin data having complete defective bin data and another portion of the bin data having non-defective bin data, wherein the defective bin data comprises N percentage of the entries determined in the iterative generating and testing;
    in a second training stage, training a runtime model using the third training set and the one or more training parameters that were determined during the first training stage in the iteratively generating and testing of the test model;
    returning, by the computing system, the runtime model;
    executing the runtime model to generate, in real-time, model output that identifies a defective bin in the distribution center; and
    returning, in real-time and based on the model output, information about a defect associated with the defective bin, wherein the information is used by a user to respond to the defect associated with the defective bin, wherein the defect includes at least one of (i) a missing item in the defective bin, (ii) an overage in unit quantity, (iii) a shortage in unit quantity, or (iv) an unexpected item in the defective bin.

2. The method of claim 1, further comprising:
    selecting, by the computing system, a predetermined quantity of the testing data, using random sampling, for testing the test model.

3. The method of claim 2, wherein the predetermined quantity is 20% of the testing data.

4. The method of claim 1, further comprising storing, by the computing system, (i) the N percentage of the entries determined in the iterative generating and testing steps and (ii) the one or more training parameters.

5. The method of claim 1, wherein the one or more training parameters include a threshold f-score value.

6. The method of claim 1, further comprising:
    retrieving, by the computing system, the runtime model for runtime use;

receiving, by the computing system, runtime data associated with the distribution center, wherein the data includes at least one of bin history data and worker history data;

providing, by the computing system, the data as input to the runtime model; and returning, by the computing system, output from the runtime model indicating defectiveness probability scores for bins in the distribution center, wherein a defectiveness probability score indicates a likelihood that a respective bin is defective.

7. The method of claim 6, further comprising:

ranking, by the computing system, the bins in the distribution center based on the defectiveness probability scores, from a highest defectiveness probability score to a lowest defectiveness probability score; and returning, by the computing system, a subset of the ranked bins that satisfy threshold defective bin conditions for presentation in a graphical user interface (GUI) display at a user device.

8. The method of claim 7, further comprising:

generating, by the computing system, a quantity of bin rank buckets based on availability of labor resources to audit the bins in the distribution center;

allocating, by the computing system, subsets of the ranked bins to each of the bin rank buckets; and transmitting, by the computing system, each of the bin rank buckets to user devices of employees in the distribution center for presentation in GUI displays of the respective user devices, wherein the user devices of the employees comprises the worker computing device.

9. The method of claim 8, wherein:

ranking, by the computing system, the bins in the distribution center is based on location data for each of the bins, and each of the bin rank buckets corresponds to a different location in the distribution center.

10. The method of claim 6, wherein the runtime data includes, for each of the bins in the distribution center, at least one of (i) a value indicating how recent the bin was accessed by an employee of the distribution center, (ii) whether an inaccuracy about the bin was reported by the employee, (iii) how many employees access the bin over a threshold period of time, (iv) a propensity of the employees who access the bin to misplace items in the bin or other bins, and (v) a propensity of the employees who access the bin to miss-pick items from the bin or other bins.

11. The method of claim 1, wherein the bin data includes, for each bin in the distribution center, at least one of (i) bin state data, (ii) bin location data, (iii) bin item data, (iv) bin transaction data, (v) bin pull data, and (vi) historical bin activities performed with regards to the bins in the distribution center over a predetermined period of time.

12. The method of claim 1, wherein partitioning, by the computing system, the bin data into testing data and training data comprises selecting the testing data based on a random sampling of the bin data.

13. A system for training and executing a model to identify defective bins in a distribution center, the system comprising:

one or more processors; and memory storing instructions that, when executed, cause the one or more processors to perform operations comprising:

retrieving, from a data store, bin data for the distribution center, wherein the bin data includes historical bin activities performed with regard to bins in the distribution center;

partitioning the bin data into testing data and training data, wherein the testing data is selected from the bin data;

identifying, from among the bins, defective bins in the training data that have been flagged as defective to identify defective bin data;

generating a first training set comprising the identified defective bin data;

generating a second training set comprising remaining data in the training data that was not identified as the defective bin data;

in a first training stage, iteratively generating and testing models until a test model is generated from the models that satisfies one or more performance testing criteria, the iteratively generating and testing comprising:

generating a model training dataset that comprises a combination of (i) the first training set and (ii) the second training set such that the first training set comprises N percentage of entries in the model training dataset, training the test model to identify defective bins in the distribution center based on the model training dataset, wherein the test model is generated using one or more training parameters, testing the test model using the testing data based on accuracy of the test model in identifying defective bins in the testing data, determining whether, based on the testing, the test model satisfies the one or more performance testing criteria, based on determining that the test model does not satisfy the one or more performance testing criteria, (i) incrementing, by the computing system, a value of the N percentage of the entries in the model training dataset and (ii) adjusting at least a portion of the one or more training parameters, and iteratively performing the training, the testing, the determining, and the incrementing until the test model satisfies the one or more performance testing criteria;

in response to generating the test model that satisfies the one or more performance testing criteria, generating a third training set comprising a portion of the bin data having complete defective bin data and another portion of the bin data having non-defective bin data, wherein the defective bin data comprises N percentage of the entries determined in the iterative generating and testing;

in a second training stage, training a runtime model using the third training set and the one or more training parameters that were determined during the first training stage in the iteratively generating and testing of the test model;

returning the runtime model;

executing the runtime model to generate, in real-time, model output that identifies a defective bin in the distribution center; and returning, in real-time and based on the model output, information about a defect associated with the defective bin, wherein the information is used by a user to respond to the defect associated with the defective bin, wherein the defect includes at least one of (i) a missing item in the defective bin, (ii) an overage in unit quantity, (iii) a shortage in unit quantity, or (iv) an unexpected item in the defective bin.

14. The system of claim 13 wherein the operations further comprise:
returning output from the runtime model indicating defectiveness probability scores for bins in the distribution center, wherein a defectiveness probability score indicates a likelihood that a respective bin is defective;
ranking the bins based on the defectiveness probability scores satisfying ranking criteria;
returning a subset of the ranked bins that satisfy threshold defective bin conditions for presentation in a GUI display at a user device; and
providing information about at least one defective bin in the subset of the ranked bins to the user device for auditing and managing physical inventory associated with the at least one defective bin in the distribution center.

15. The method of claim 14, wherein ranking the bins based satisfying ranking criteria comprises grouping the bins into bin rank buckets based on bin location, wherein each of the bin rank buckets corresponds to a different location in the distribution center.

16. The system of claim 13, wherein the bin data includes at least one of (i) bin state data, (ii) bin location data, (iii) bin item data, (iv) bin transaction data, (v) bin worker data, (vi) bin pull data, and (vii) historical bin activities performed with regard to the bins in the distribution center over a predetermined period of time.

17. The system of claim 13 wherein the bin data includes, for each of the bins, at least one of (i) a value indicating how recent the bin was accessed by an employee of the distribution center, (ii) whether an inaccuracy about the bin was reported by the employee, (iii) how many employees access the bin over a threshold period of time, (iv) a propensity of the employees who access the bin to misplace items in the bin or other bins, and (v) a propensity of the employees who access the bin to miss-pick items from the bin or other bins.

18. The system of claim 13, wherein the operations further comprise generating output for presentation in the GUI display at the user device that includes a graphical depiction of average defectiveness probability scores for one or more distribution centers in the network of distribution centers.

19. The system of claim 13, wherein the operations further comprise:
testing the test model using the testing data, wherein the testing generates an f-score for the test model based on accuracy of the test model in identifying defective bins in the testing data,
determining whether, based on the testing, the f-score satisfies the one or more performance testing criteria,
based on determining that the f-score does not satisfy the one or more performance testing criteria, (i) incrementing a value of the N percentage of the entries in the model training dataset and (ii) adjusting at least a portion of the one or more training parameters, and
iteratively performing the training, the testing, the determining, and the incrementing until the f-score satisfies the one or more performance testing criteria.

20. The system of claim 13, wherein the model training dataset comprises a stratified random sampling of (i) the first training set and (ii) the second training set such that the first training set comprises N percentage of entries in the model training dataset.

* * * * *